(12) United States Patent
Yamakado et al.

(10) Patent No.: US 9,919,603 B2
(45) Date of Patent: Mar. 20, 2018

(54) OPERATION CONTROL SYSTEM FOR VEHICLE, VEHICLE, AND PROGRAM

(71) Applicant: Hitachi Automotive Systems, Ltd., Hitachinaka-shi, Ibaraki (JP)

(72) Inventors: Makoto Yamakado, Tokyo (JP); Keiichiro Nagatsuka, Hitachinaka (JP); Junya Takahashi, Tokyo (JP); Mitsuhide Sasaki, Hitachinaka (JP); Toshiyuki Innami, Hitachinaka (JP); Mikio Ueyama, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 71 days.

(21) Appl. No.: 15/116,707

(22) PCT Filed: Jan. 28, 2015

(86) PCT No.: PCT/JP2015/052256
§ 371 (c)(1),
(2) Date: Aug. 4, 2016

(87) PCT Pub. No.: WO2015/151565
PCT Pub. Date: Oct. 8, 2015

(65) Prior Publication Data
US 2016/0347181 A1    Dec. 1, 2016

(30) Foreign Application Priority Data

Mar. 31, 2014   (JP) .................................. 2014-072545

(51) Int. Cl.
*B60L 3/00* (2006.01)
*B60T 1/10* (2006.01)
(Continued)

(52) U.S. Cl.
CPC ............. *B60L 3/0015* (2013.01); *B60L 3/102* (2013.01); *B60L 3/108* (2013.01); *B60L 7/14* (2013.01);
(Continued)

(58) Field of Classification Search
CPC .. B60L 3/0015; B60L 7/18; B60L 7/26; B60L 3/102; B60L 3/108; B60L 7/14;
(Continued)

(56) References Cited

U.S. PATENT DOCUMENTS

2006/0273658 A1* 12/2006 Halassy-Wimmer ..... B60T 7/12
                                                        303/191
2008/0100129 A1*  5/2008 Lubbers .................... B60K 6/48
                                                        303/113.1
(Continued)

FOREIGN PATENT DOCUMENTS

JP    2001-8306 A    1/2001
JP    2001-39281 A   2/2001
(Continued)

OTHER PUBLICATIONS

English translation of Japanese Office Action issued in counterpart Japanese Application No. 2014-072545 dated Jan. 4, 2017 (three pages).
(Continued)

*Primary Examiner* — Ian Jen
(74) *Attorney, Agent, or Firm* — Crowell & Moring LLP

(57) ABSTRACT

The present invention improves emergency evasion performance. An operation control system for a vehicle that is provided with a risk-potential determining unit that determines the risk potential of a vehicle on the basis of external environment information and/or vehicle information, a friction braking unit that applies friction braking force to the vehicle, and a regenerative braking device that applies
(Continued)

regenerative braking force to the vehicle, the operation control system being provided with a control value determining unit that determines a first control value that is for determining the size of the friction braking force and determines a second control value that is for determining the size of the regenerative braking force. The control value determining unit determines at least the first control value on the basis of the risk potential determined by the risk-potential determining unit.

21 Claims, 22 Drawing Sheets

(51) Int. Cl.
| | | |
|---|---|---|
| B60T 7/12 | (2006.01) | |
| B60T 7/18 | (2006.01) | |
| B60T 7/22 | (2006.01) | |
| B60T 8/17 | (2006.01) | |
| B60W 30/09 | (2012.01) | |
| B60L 3/10 | (2006.01) | |
| B60L 7/14 | (2006.01) | |
| B60L 7/26 | (2006.01) | |
| B60L 11/18 | (2006.01) | |
| B60L 15/02 | (2006.01) | |
| B60L 15/20 | (2006.01) | |
| B60L 7/18 | (2006.01) | |
| B60T 8/172 | (2006.01) | |
| B60T 8/174 | (2006.01) | |
| B60T 8/58 | (2006.01) | |

(52) U.S. Cl.
CPC ...... *B60L 7/18* (2013.01); *B60L 7/26* (2013.01); *B60L 11/1803* (2013.01); *B60L 11/1861* (2013.01); *B60L 15/025* (2013.01); *B60L 15/20* (2013.01); *B60L 15/2009* (2013.01); *B60T 1/10* (2013.01); *B60T 7/12* (2013.01); *B60T 7/18* (2013.01); *B60T 7/22* (2013.01); *B60T 8/17* (2013.01); *B60T 8/172* (2013.01); *B60T 8/174* (2013.01); *B60T 8/58* (2013.01); *B60W 30/09* (2013.01); *B60L 2240/12* (2013.01); *B60L 2240/14* (2013.01); *B60L 2240/16* (2013.01); *B60L 2240/18* (2013.01); *B60L 2240/20* (2013.01); *B60L 2240/22* (2013.01); *B60L 2240/24* (2013.01); *B60L 2240/421* (2013.01); *B60L 2240/423* (2013.01); *B60L 2240/461* (2013.01); *B60L 2240/463* (2013.01); *B60L 2240/465* (2013.01); *B60L 2240/622* (2013.01); *B60L 2240/68* (2013.01); *B60L 2240/80* (2013.01); *B60L 2250/10* (2013.01); *B60L 2250/16* (2013.01); *B60L 2250/26* (2013.01); *B60L 2260/42* (2013.01); *B60L 2270/142* (2013.01); *B60L 2270/145* (2013.01); *B60T 2201/022* (2013.01); *B60T 2210/32* (2013.01); *B60T 2250/03* (2013.01); *B60T 2270/604* (2013.01); *Y02T 10/643* (2013.01); *Y02T 10/705* (2013.01); *Y02T 10/7005* (2013.01); *Y02T 10/7044* (2013.01); *Y02T 10/72* (2013.01); *Y02T 10/7275* (2013.01); *Y02T 10/7291* (2013.01); *Y02T 90/16* (2013.01); *Y02T 90/162* (2013.01)

(58) Field of Classification Search
CPC ..... B60L 11/1803; B60L 11/1861; B60L 15/025; B60L 15/20; B60L 15/2009; B60T 8/172; B60T 8/174; B60T 8/58; B60T 7/22; B60T 1/10; B60T 7/12; B60T 7/18
See application file for complete search history.

(56) References Cited

U.S. PATENT DOCUMENTS

| | | |
|---|---|---|
| 2012/0022759 A1 | 1/2012 | Inoue et al. |
| 2012/0158266 A1* | 6/2012 | Miyazaki ............... B60L 7/26 701/70 |
| 2013/0211644 A1 | 8/2013 | Yokoyama et al. |
| 2014/0052339 A1* | 2/2014 | Takahashi ............. B60T 7/042 701/41 |
| 2014/0131150 A1* | 5/2014 | Nimura ................. B60L 1/003 188/158 |
| 2016/0052495 A1* | 2/2016 | Nakaso .................. B60T 7/22 701/70 |
| 2016/0059852 A1 | 3/2016 | Yamakado et al. |

FOREIGN PATENT DOCUMENTS

| | | |
|---|---|---|
| JP | 2006-254553 A | 9/2006 |
| JP | 2009-262701 A | 11/2009 |
| JP | 2010-162911 A | 7/2010 |
| JP | 2012-25274 A | 2/2012 |
| JP | 2013-163422 A | 8/2013 |
| JP | 2014-193691 A | 10/2014 |

OTHER PUBLICATIONS

International Search Report (PCT/ISA/210) issued in PCT Application No. PCT/JP2015/052256 dated Apr. 7, 2015, with English translation (four (4) pages).

Makoto Yamakado et al., "Comparison and combination of direct yaw-moment control and G-Vectoring control", Vehicle Systems Dynamics, vol. 50, Supplement, 2012, pp. 111-130.

English translation of Written Opinion (PCT/ISA/237) issued in PCT Application No. PCT/JP2015/052256 dated Apr. 7, 2015 (seven pages).

* cited by examiner

FIG. 17A
| | EVALUATION INDEX OF RISK POTENTIAL |
|---|---|
| RP0 | THERE IS NO POSSIBILITY OF COLLISION |
| RP1 | THERE IS A POSSIBILITY OF COLLISION |
| RP2 | THERE IS A HIGH DEGREE OF POSSIBILITY OF COLLISION |
| RP3 | THERE IS AN EXTREMELY HIGH DEGREE OF POSSIBILITY OF COLLISION |
FIG. 17B
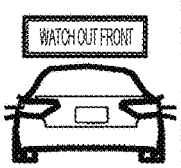
FIG. 17C
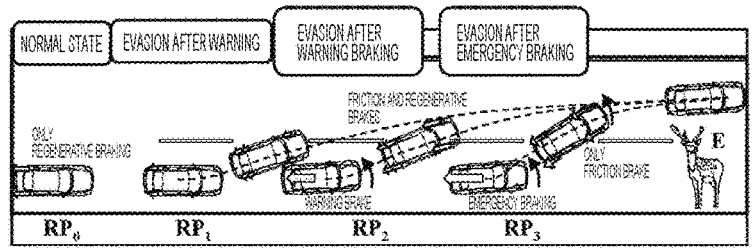

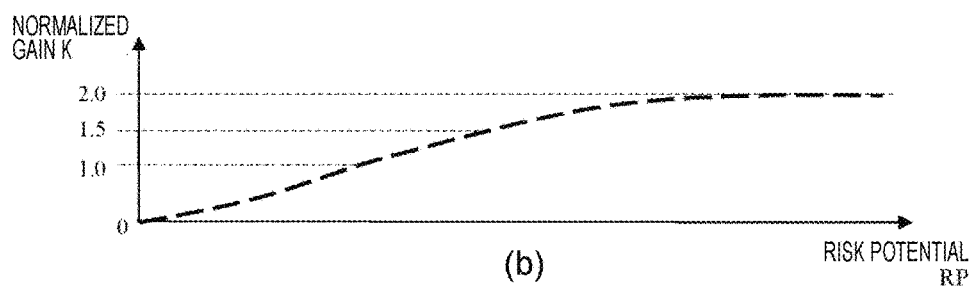
FIG. 29
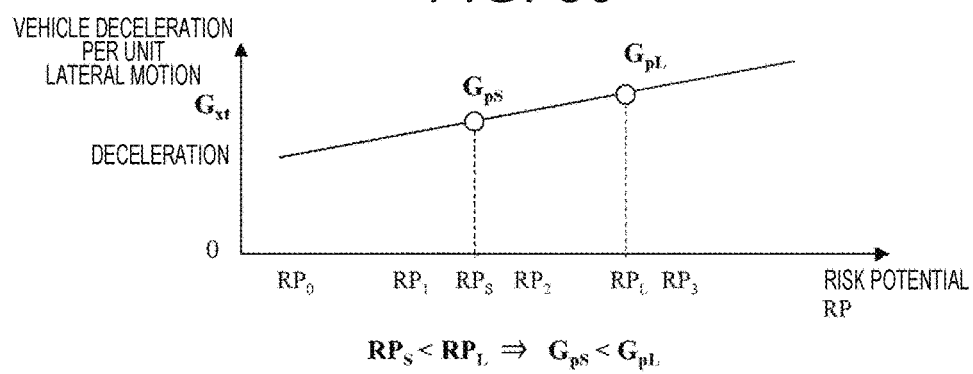
FIG. 30
$RP_S < RP_L \Rightarrow G_{pS} < G_{pL}$
FIG. 31
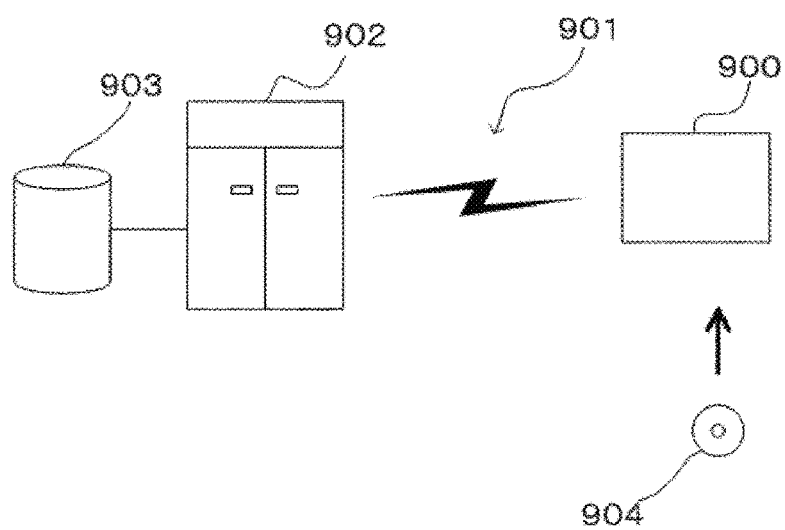

OPERATION CONTROL SYSTEM FOR VEHICLE, VEHICLE, AND PROGRAM

TECHNICAL FIELD

The present invention relates to an operation control system for a vehicle.

BACKGROUND ART

In recent years, various kinds of automatic brake control apparatuses have been suggested and put into practice to prevent collision by performing automatic brake control independent from driver's brake operation when a risk potential is high, e.g., the driver's vehicle is likely to collide with a preceding vehicle and an obstacle.

PTL 1 discloses a technique in which, in a case where, e.g., an operation of a brake pedal is performed, or a vehicle avoids collision with a preceding vehicle or an obstacle in front of the vehicle in the travel direction, a requested braking force for decelerating the vehicle is calculated, and in a case where a regenerative performance is provided, the regenerative braking force is determined to be as high as possible, and the shortage of the force is compensated by a friction braking force.

CITATION LIST

Patent Literature

PTL 1: JP 2013-163422 A

SUMMARY OF INVENTION

Technical Problem

In the invention of PTL 1, a braking and driving force is distributed among the front wheels and the rear wheels on the basis of the braking and driving force requested in the vehicle, and when there is a decrease in a rate of a braking force with respect to a slip ratio in at least one of the front wheels and the rear wheels, the braking and driving force is reduced in one of the front wheels and the rear wheels whichever generate a braking and driving force with an electric motor. According to this method, in a normal travelling situation, the use of the friction braking force can be reduced as much as possible, and the energy collected by regenerative braking can be maximized.

However, according to the above method described in PTL 1, in a case where there is a regenerative performance, the regenerative braking force is determined to be as large as possible, and the insufficient portion is controlled to be compensated with the friction braking force, and therefore, an appropriate braking force may not be immediately obtained.

Solution to Problem

An operation control system for a vehicle according to claim 1 includes: a risk-potential determining unit determining a risk potential of a vehicle on the basis of at least one of external environment information and vehicle information; a friction braking device giving a friction braking force to the vehicle; and a regenerative braking device giving a regenerative braking force to the vehicle, wherein the operation control system includes a control value determining unit determining a first control value for determining a magnitude of the friction braking force and a second control value for determining a magnitude of the regenerative braking force, and the control value determining unit determines at least the first control value on the basis of a risk potential determined by the risk-potential determining unit.

The operation control system for the vehicle according to claim 2 is the operation control system for the vehicle according to claim 1, wherein in a case where the risk potential determined by the risk-potential determining unit becomes higher, the control value determining unit determines the first control value so that the magnitude of the friction braking force becomes larger.

The operation control system for the vehicle according to claim 3 is the operation control system for the vehicle according to claim 2, wherein the control value determining unit is a ratio determining unit determining a distribution ratio of the friction braking force as the first control value and determining a distribution ratio of the regenerative braking force as the second control value in order to distribute a braking force applied to the vehicle to the friction braking force and the regenerative braking force, in a case where the risk potential determined by the risk-potential determining unit is less than a predetermined value, the ratio determining unit lets the distribution ratio of the friction braking force be a value less than the distribution ratio of the regenerative braking force, and in a case where the risk potential determined by the risk-potential determining unit is higher than a predetermined value, the ratio determining unit lets the distribution ratio of the friction braking force be a value larger than the distribution ratio of the regenerative braking force.

The operation control system for the vehicle according to claim 4 is the operation control system for the vehicle according to claim 2, wherein in a case where the risk potential determined by the risk-potential determining unit becomes higher, the control value determining unit determines the second control value so that a magnitude of the regenerative braking force becomes smaller.

The operation control system for the vehicle according to claim 5 is the operation control system for the vehicle according to one of claims 1 to 4, including a braking wheel control unit increasing a number of wheels, to which the braking force is applied, in a case where the risk potential determined by the risk-potential determining unit becomes higher.

The operation control system for the vehicle according to claim 6 is the operation control system for the vehicle according to one of claims 1 to 4, including: a deceleration determining unit determining a deceleration of the vehicle on the basis of the risk potential determined by the risk-potential determining unit; and a braking force determining unit determining the magnitude of the friction braking force on the basis of the deceleration and the first control value, and determining the magnitude of the regenerative braking force on the basis of the deceleration and the second control value.

The operation control system for the vehicle according to claim 7 is the operation control system for the vehicle according to claim 6, wherein the deceleration determined by the deceleration determining unit becomes higher as the risk potential becomes higher.

The operation control system for the vehicle according to claim 8 is the operation control system for the vehicle according to any one of claims 1 to 4, including: a deceleration determining unit determining the deceleration of the vehicle on the basis of one of or both of a steering operation for the vehicle and a lateral motion of the vehicle; and a braking force determining unit determining the magnitude of the friction braking force on the basis of the deceleration and the first control value, and determining the magnitude of the regenerative braking force on the basis of the deceleration and the second control value.

The operation control system for the vehicle according to claim 9 is the operation control system for the vehicle according to any one of claims 1 to 4, wherein an external environment information obtaining unit obtaining the external environment information is constituted by at least one of a vehicle front information detection unit detecting information about an object existing in front of the vehicle, an inter-vehicle communication unit receiving information about another vehicle existing around the vehicle, and a road-vehicle communication unit receiving environment information in front of the vehicle, and a vehicle information obtaining unit obtaining the vehicle information is constituted by at least one of a vehicle speed detection unit detecting a vehicle speed of the vehicle, a steering angle detection unit detecting a steering angle of the vehicle, an acceleration detection unit detecting an acceleration of the vehicle, a yawrate detection unit detecting a yawrate of the vehicle, an acceleration operation speed detection unit detecting an operation speed of an acceleration pedal of the vehicle, and a brake operation speed detection unit detecting an operation speed of a brake pedal of the vehicle.

The operation control system for the vehicle according to claim 10 is the operation control system for the vehicle according to any one of claims 1 to 4, wherein the risk-potential determining unit determines the risk potential on the basis of at least one of a time-to-collision between the vehicle and an obstacle, a steering angle of the vehicle, a deviation between an estimated value of a lateral motion of the vehicle and an actually-measured value.

The operation control system for the vehicle according to claim 11 is the operation control system for the vehicle according to any one of claims 1 to 4, including: a first storage unit previously storing characteristics of the first control value that becomes larger as the risk potential becomes higher, wherein the control value determining unit determines the first control value corresponding to the risk potential on the basis of a characteristic of the first control value stored in the first storage unit.

The operation control system for the vehicle according to claim 12 is the operation control system for the vehicle according to claim 8, including: a gain storage unit previously storing a characteristic of a gain that becomes larger as the risk potential becomes higher, wherein the deceleration determining unit includes: a first deceleration determining unit determining a first deceleration of the vehicle on the basis of the risk potential; a gain determining unit determining the gain corresponding to the risk potential on the basis of the characteristic of the gain stored in the gain storage unit; and a second deceleration determining unit determining a second deceleration by multiplying the first deceleration determined by the first deceleration determining unit by the gain determined by the gain determining unit, and the braking force determining unit determines the magnitude of the friction braking force on the basis of the second deceleration and the first control value, and determines the magnitude of the regenerative braking force on the basis of the second deceleration and the second control value.

The operation control system for the vehicle according to claim 13 is the operation control system for the vehicle according to claim 8, including: a lateral acceleration detection unit detecting a lateral acceleration of the vehicle, wherein the deceleration determining unit is a longitudinal acceleration determining unit for determining a longitudinal acceleration for decelerating the vehicle as an absolute value of a lateral acceleration of the vehicle increases, and accelerating the vehicle as the absolute value of the lateral acceleration of the vehicle decreases.

The operation control system for the vehicle according to claim 14 is the operation control system for the vehicle according to claim 8, including: a steering angle detection unit detecting a steering angle of the vehicle, wherein the deceleration determining unit is a longitudinal acceleration determining unit for determining a longitudinal acceleration for decelerating the vehicle as an absolute value of a steering angle of the vehicle increases, and accelerating the vehicle as the absolute value of the steering angle of the vehicle decreases.

The operation control system for the vehicle according to claim 15 is the operation control system for the vehicle according to claim 8, wherein the deceleration determining unit is a longitudinal acceleration determining unit determining a longitudinal acceleration $G_x$ in accordance with the following expression,

[Math 1]

$$G_x = -\text{sgn}(G_y \cdot \dot{G}_y)\frac{C_{xy}}{1+Ts}|\dot{G}_y| + G_{x\_DC} \quad \text{※} \; \dot{G}_y = G_{y\_dot}$$

where $G_y$ denotes a lateral acceleration of the vehicle, $G_{y\_dot}$ denotes a lateral jerk of the vehicle, $C_{xy}$ denotes a gain, T denotes a first-order delay time constant, s denotes a Laplace operator, $G_{x\_DC}$ denotes a longitudinal acceleration associated with the lateral motion of the vehicle.

The operation control system for the vehicle according to claim 16 is the operation control system for the vehicle according to claim 8, wherein the deceleration determining unit is a longitudinal acceleration determining unit, wherein in a case where, in a vehicle fixed coordinate system in which a forward direction of the vehicle is defined as positive in an x axis and a left direction of the vehicle is denoted as positive in a y axis, a steering input to a left side which is positive in the y direction is input into the vehicle, or the vehicle starts a left turning which is positive in the y direction, a lateral acceleration of the vehicle is generated in a positive direction, and a longitudinal acceleration of the vehicle is generated in a negative direction, so that, in a coordinate system in which a longitudinal acceleration of the vehicle is defined as an x axis, and a lateral acceleration of the vehicle is defined as a y axis, the longitudinal acceleration determining unit determines a longitudinal acceleration in such a manner a transition of a coordinate representing a longitudinal acceleration and a lateral acceleration becomes a smooth curved line in a clockwise direction from around the origin point to a second quadrant.

A vehicle according to claim 17 includes the operation control system for the vehicle according to any one of claims 1 to 4.

A program according to claim 18 is a program for causing a computer to execute risk potential determination processing for determining a risk potential of a vehicle having a friction braking device and a regenerative braking device on the basis of at least one of external environment information and vehicle information, wherein the program causes the computer to execute control value determination processing for determining a first control value for determining a magnitude of a friction braking force which is given by the friction braking device to the vehicle, and determining a second control value for determining a magnitude of a regenerative braking device which is given by the regenerative braking device to the vehicle, and in the control value determination processing, a first control value for determining at least the magnitude of the friction braking force is determined on the basis of the risk potential determined in the risk potential determination processing.

The program according to claim 19 is the program according to claim 18, wherein, in the control value determination processing, in a case where the risk potential determined in the risk potential determination processing becomes higher, the first control value is determined so that the magnitude of the friction braking force becomes larger.

The program according to claim 20 is the program according to claim 19, wherein in the control value determination processing, a distribution ratio of the friction braking force for a braking force of the vehicle is determined as the first control value, and a distribution ratio of the regenerative braking force for the braking force of the vehicle is determined as the second control value, in a case where the risk potential is less than a predetermined value, the distribution ratio of the friction braking force is defined as a value smaller than the distribution ratio of the regenerative braking force, and in a case where the risk potential is more than the predetermined value, the distribution ratio of the friction braking force is defined as a value larger than the distribution ratio of the regenerative braking force.

The program according to claim 21 is the program according to claim 19, wherein in the control value determination processing, in a case where the risk potential becomes higher, the second control value is determined so that the magnitude of the regenerative braking force becomes smaller.

Advantageous Effects of Invention

According to the present invention, a first control value for determining the magnitude of the friction braking force can be determined on the basis of a risk potential, for example, before a steering operation for emergency evasion is performed and before an automatic brake is activated. Therefore, an appropriate deceleration can be generated by using a friction braking force for a vehicle in accordance with a driver's operation during emergency evasion or in an initial stage immediately after a braking force is automatically generated in the vehicle. More specifically, according to the present invention, the emergency evasion performance can be improved.

BRIEF DESCRIPTION OF DRAWINGS

FIG. 17A is a figure illustrating a correspondence table between a quantitative risk potential RP and an evaluation index of the qualitative risk potential, FIG. 17B is a table illustrating an activation situation of each system with respect to the risk potential RP, and FIG. 17C is an explanatory diagram for explaining a braking force applied to the vehicle automatically in accordance with a relative distance to an elk E, and a braking force applied to the vehicle performing avoiding operation in accordance with driver's steering operation.

FIG. 29 is a figure illustrating a relationship between a risk potential and a normalization gain.

FIG. 30 is a graph in which the vertical axis represents a deceleration of the vehicle per unit lateral motion, and the horizontal axis represents the risk potential.

FIG. 31 is a figure illustrating how programs are provided in a storage medium and a data signal.

DESCRIPTION OF EMBODIMENTS

Figure 1A:
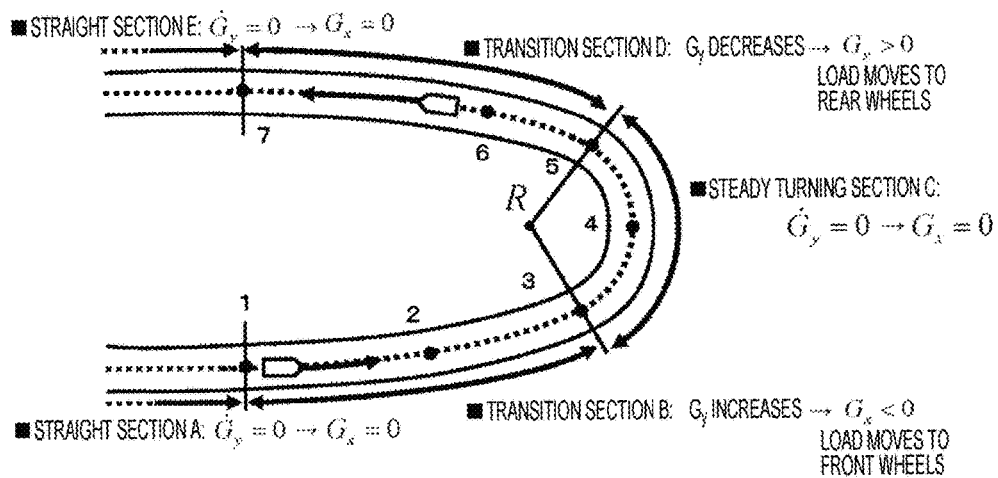
FIG. 1A is a schematic diagram schematically illustrating how a vehicle enters into a corner and leaves the corner.

The inventors of the present application has made an invention described in "Yamakado, M., Takahashi, J., Saito, S.: "Comparison and combination of Direct-Yaw-moment Control and G-Vectoring Control", Vehicle System Dynamics, Vol. 48, Supplement, pp. 231-254, 2012" (hereinafter referred to as NPL 1), and achieved an improvement in emergency evasion performance as compared with the past.

As a result of repeatedly conducted various kinds of experiments and considerations after the invention described in NPL 1 was made, the inventors of the present application has found the following problem, and invented an operation control system for a vehicle solving this problem. Further, this invention is not limited to the invention of NPL 1, and it is found that this invention can solve the problems associated with problems in other inventions such as the problem in the invention described in PTL 1. In this specification, the problems found in various kinds of experiments and consideration for the invention of NPL 1 are explained, and the embodiments of the present invention for solving this problem will be explained.

<Longitudinal Acceleration Control in Associated with Lateral Motion (GVC: G-Vectoring Control)>

NPL 1 describes a method of improving the maneuverability and the stability of a vehicle by generating a load shift between front wheels and rear wheels by automatically accelerating and decelerating in associated with lateral motion caused by steering operation of a steering 16. More specifically, a target longitudinal acceleration $G_x$ is expressed by expression (1). When the longitudinal acceleration is positive, the longitudinal acceleration expresses a forward acceleration. When the longitudinal acceleration is negative, the longitudinal acceleration expresses a backward acceleration, i.e., deceleration. In the following explanation, the longitudinal acceleration is also denoted as an acceleration and deceleration.

[Math 2]

$$G_x = -\text{sgn}(G_y \cdot \dot{G}_y)\frac{C_{xy}}{1+Ts}|\dot{G}_y| + G_{x\_DC} \quad \text{※} \quad \dot{G}_y = G_{y\_dot} \qquad (1)$$

In this case, $G_y$ denotes a lateral acceleration of a vehicle, $G_y\_dot$ denotes a lateral jerk of the vehicle, $C_{xy}$ denotes a gain, T denotes a first-order delay time constant, and s denotes Laplace operator. The first term at the right-hand side is a longitudinal acceleration in associated with a lateral motion. $G_{x\_DC}$ at the second term at the right-hand side is a longitudinal acceleration (offset value) not in associated with the lateral motion, and is a deceleration determined by a longitudinal acceleration determined on the basis of driver's operation and an automatic brake control. The sgn (signum) term is a term provided to be able to obtain the above operation for both of a right corner and a left corner.

In a control law expressed in the expression (1), basically, the lateral jerk $G_y\_dot$ is multiplied by the gain $C_{xy}$, and a value to which a first-order delay is applied is adopted as the target longitudinal acceleration. Therefore, a part of an associated control strategy of the lateral motion and the longitudinal operation of an expert driver can be simulated, and lateral motion and the longitudinal operation of the vehicle can be improved. More specifically, as explained later, the vehicle can achieve an operation for decelerating at a turn-in when the driver starts to perform additional steering turning operation, i.e., steering operation for increasing the steering angle, and the vehicles stops the deceleration when the vehicle is making a steady turn and the lateral jerk becomes zero, and the vehicle accelerates when the vehicle exists from the corner when the driver starts to perform additional steering returning operation, i.e., steering operation for reducing the steering angle.

According to this control, a composite acceleration G of the longitudinal acceleration and the lateral acceleration is oriented to shift in a curved form with the lapse of time in a g-g diagram (see FIG. 1(b)) where the longitudinal acceleration of the vehicle is represented in the horizontal axis, and the lateral acceleration of the vehicle is represented on the vertical axis, and is thus referred to as the "G-Vectoring (registered trademark) control (hereinafter referred to as GVC)".

A vehicle operation applied with the GVC will be described in view of a specific cruising scene.

FIG. 1(a) is a schematic diagram schematically illustrating how a vehicle enters into a corner and exists from the corner. The travel path as illustrated in FIG. 1 includes a straight section A constituted by a straight line portion, a transition section B constituted by an easement curved line, a steady turning section C constituted by a curved portion having a certain curvature, a transition section D constituted by an easement curved line, and a straight section E constituted by a straight line portion.

Figure 2:
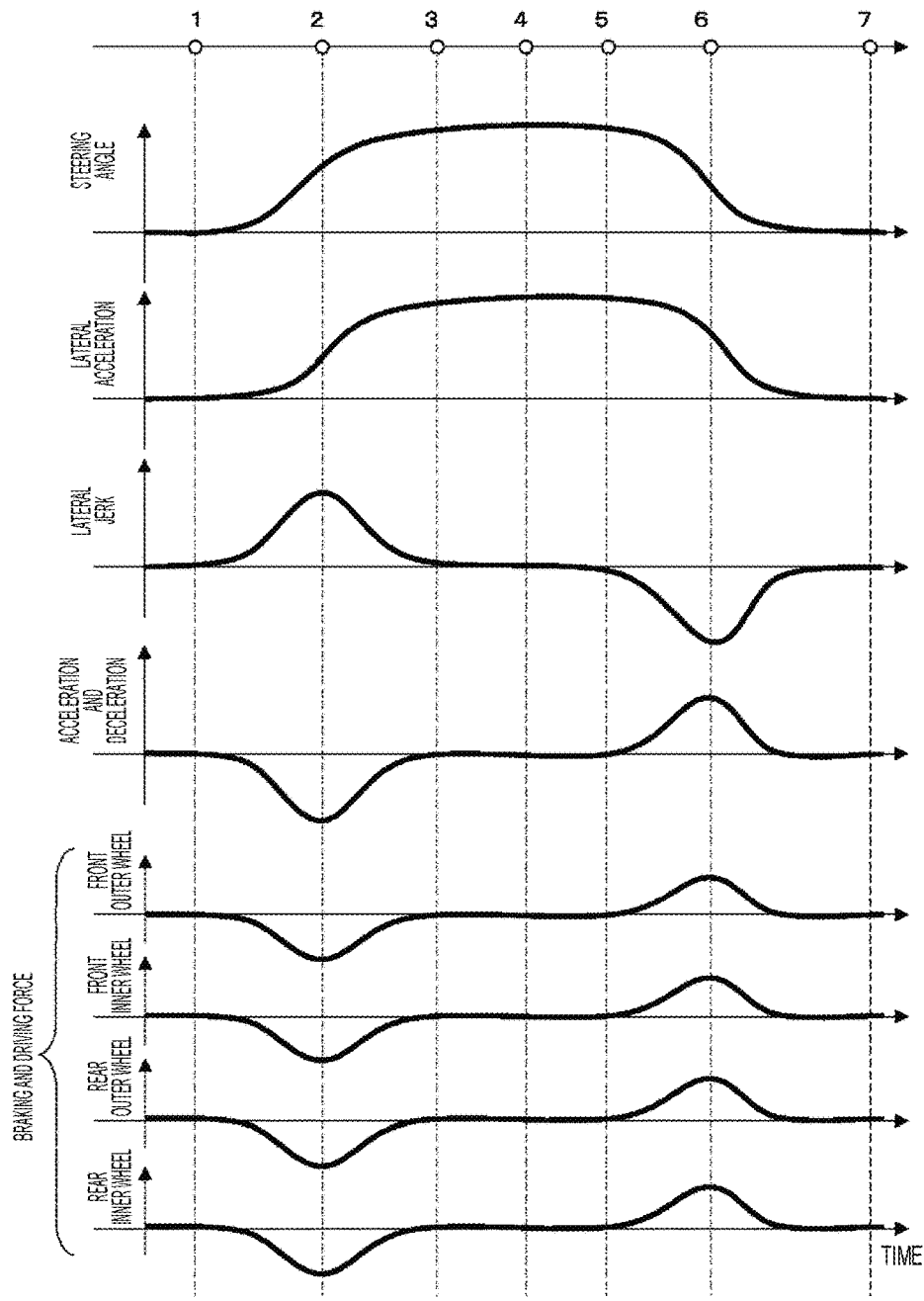
FIG. 2 is a figure illustrating a time history waveform of steering angle, lateral acceleration, lateral jerk, acceleration and deceleration, and braking and driving force of four wheels.

FIG. 2 is a figure illustrating, as a time history waveform, an acceleration and deceleration (target longitudinal acceleration) calculated from the steering angle, the lateral acceleration, the lateral jerk, and expression (1), and a braking and driving force acting on four wheels with an electric motor. In a left turn, a front outer wheel is a right front wheel, a front inner wheel is a left front wheel, a rear outer wheel is a right rear wheel, and a rear inner wheel is a left rear wheel. A braking force and a driving force (hereinafter referred to as braking and driving force) are distributed so that the same value is distributed to the left and right wheels (inner and outer wheels) for the front outer wheel, the front inner wheel, the rear outer wheel, and the rear inner wheel.

The braking and driving force is a generic term indicating a force generated in each of the wheels in the longitudinal direction of the vehicle. The braking force is a force acting in a direction for decelerating the vehicle, and the driving force is a force acting in a direction for accelerating the vehicle. In the explanation, it is assumed that the driver does not perform any acceleration and deceleration operation while the vehicle cruises, and the longitudinal acceleration $G_{x\_DC}$ associated with the lateral motion is zero.

When the vehicle enters into a corner from the straight section A and enters into the transition section B (a point 1 to a point 3), the lateral acceleration $G_y$ of the vehicle increases as the driver gradually performs additional steering turning operation for increasing the steering angle. Therefore, while the lateral acceleration $G_y$ increases in the transition section B, the lateral jerk $G_y\_dot$ has a positive value, and at a point in time of the point 3 where the lateral acceleration $G_y$ stops increasing, the lateral jerk $G_y\_dot$ returns back to zero. In the transition section B, according to the expression (1), the target longitudinal acceleration $G_x$ yields a negative value indicating deceleration while the lateral acceleration $G_y$ for the vehicle is increasing. Accordingly, a braking force having substantially the same magnitude (the braking and driving force is a negative value) is applied to each of the front outer wheel, the front inner wheel, the rear outer wheel, and the rear inner wheel.

When the vehicle enters into the steady turning section C (point 3 to point 5), the driver stops performing additional steering turning operation, and the driver maintains a constant steering angle. In the steady turning section C, the lateral jerk $G_y\_dot$ becomes zero, and therefore, according to the expression (1), the target longitudinal acceleration $G_x$ yields zero. Accordingly, the braking and driving force of each of the wheels is zero.

When the vehicle enters into the transition section D (a point 5 to a point 7), the lateral acceleration $G_y$ of the vehicle decreases as the driver gradually performs additional steering returning operation for decreasing the steering angle. Accordingly, while the lateral acceleration decreases in the transition section D, the lateral jerk $G_y\_dot$ has a negative value, and at a point in time of the point 7 where the lateral acceleration $G_y$ stops decreasing, the lateral jerk $G_y\_dot$ returns back to zero. In the transition section D, according to the expression (1), while the lateral acceleration $G_y$ of the vehicle decreases, the target longitudinal acceleration $G_x$ yields a positive value indicating acceleration. Accordingly, a driving force having substantially the same magnitude (the braking and driving force is a positive value) is applied to each of the front outer wheel, the front inner wheel, the rear outer wheel, and the rear inner wheel.

When the vehicle enters into the straight section E, the lateral acceleration $G_y$ is zero, and the lateral jerk $G_y\_dot$ is also zero, and therefore, the acceleration and deceleration control is not performed. As described above, from the point in time when the driver starts the additional steering turning operation (point 1), the curvature of the corner gradually increases, and the vehicle decelerates through the point where the curvature is the largest (point 3), and the vehicle stops the deceleration during the steady turning (point 3 to point 5) in the curved portion where the curvature is constant, and the vehicle accelerates from when the driver starts the additional steering returning operation (point 5) to when the vehicle exits from the corner (point 7). As described above, when the GVC is applied to the vehicle, the driver performs only the steering operation for turning (the additional steering turning and the additional steering returning operation), so that the longitudinal acceleration and the deceleration operation associated with the lateral motion can be realized.

Figure 1B:
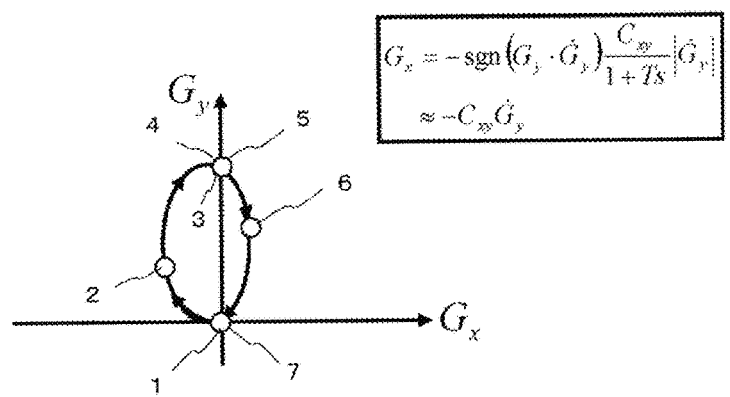
FIG. 1B is a g-g diagram illustrating acceleration associated with lateral motion and deceleration operation.

FIG. 1(b) is a g-g diagram illustrating acceleration and deceleration operation associated with lateral motion. The coordinate system as illustrated in FIG. 1(b) is a coordinate system in which the target longitudinal acceleration $G_x$ is indicated in the horizontal axis (x axis) and the lateral acceleration $G_y$ is indicated in the vertical axis (y axis). Reference numerals 1 to 7 given to the points correspond to the point 1 to the point 7, respectively, of FIG. 1(a).

In a vehicle fixed coordinate system in which the front side of the vehicle is represented as a positive side in the x axis and the left hand side of the vehicle is represented as a positive side in the y axis, in a case where a left hand side steering input, which is the positive side in the y direction, is input into the vehicle, or in a case where the vehicle starts a left turn which is the positive side in the y direction, a lateral acceleration in the positive direction and a longitudinal acceleration in the negative direction are generated in the vehicle with the GVC.

Accordingly, in the g-g diagram, the track of the coordinate representing the longitudinal acceleration and the lateral acceleration makes a characteristic operation in such a manner that the track is in a smooth clockwise curved line extending from a point in proximity to the origin point to the second quadrant, i.e., making a transition to draw a clockwise circle. In other words, the target longitudinal acceleration $G_x$ determined by the GVC is determined so that the coordinate representing the longitudinal acceleration and the lateral acceleration in this g-g diagram makes a transition in a curved line manner as the elapse of the time.

It should be noted that, in a case where the vehicle enters into a left corner and exits from the left corner, the transition is a clockwise transition as illustrated in FIG. 1(b), but when the vehicle enters into a right corner and exits from the right corner, the transition forms a transition path obtained by reversing the transition path of the left corner with respect to the x axis, and the transition direction thereof is a counter-clockwise rotation, which is not shown in the figure. When the vehicle makes such transition, the pitching motion generated in the vehicle by the longitudinal acceleration and the roll motion generated by the lateral acceleration are preferably associated with each other, and the peak values of the roll rate and the pitch rate are reduced.

The control law represented by the expression (1) is expressed as an expression (2) when the signum function for the lateral motion and the first-order delay term are omitted. The target longitudinal acceleration $G_x$ associated with the lateral motion is a value obtained by multiplying the lateral jerk ($G_y\_dot$) by the gain ($-C_{xy}$), and when the gain ($-C_{xy}$) is increased, the target longitudinal acceleration $G_x$ can be increased with respect to the same lateral jerk $G_y\_dot$.

[Math 3]

$$G_x = -C_{xy} \cdot \dot{G}_y + G_{x\_DC} \ \ \ \ \dot{X} \cdot \dot{G}_y = G_{y\_dot} \quad (2)$$

Figure 3A:
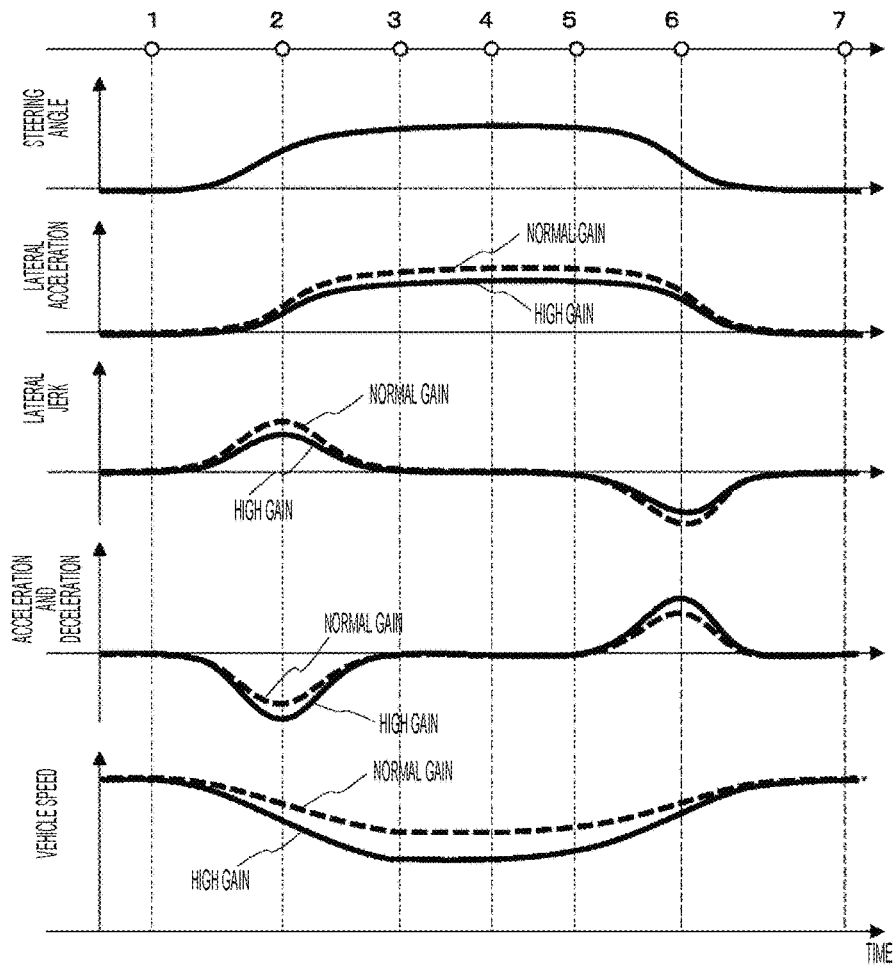
FIG. 3A is a figure illustrating, as a time history waveform, steering angle, lateral acceleration, lateral jerk, acceleration and deceleration, and vehicle speed.
Figure 3B:
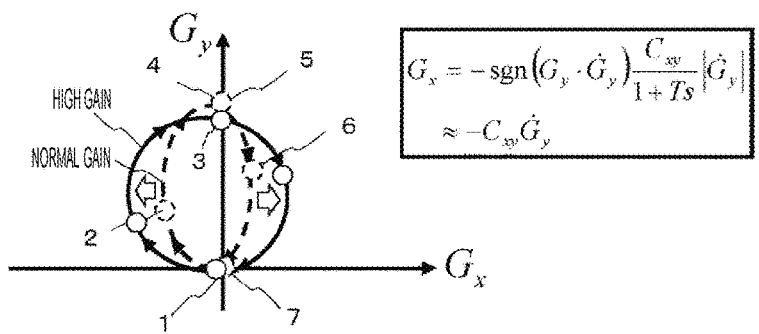
FIG. 3B is a g-g diagram illustrating acceleration associated with lateral motion and deceleration operation.

FIGS. 3(a) and 3(b) are figures obtained from a cruising with a normal gain in which the gain is a normal value in the same situation as FIG. 1 and FIG. 2 and a cruising with a high gain state in which the gain is a value higher than the normal value in the same situation as FIG. 1 and FIG. 2. FIG. 3(a) is a figure illustrating, as a time history waveform, an acceleration and deceleration (target longitudinal acceleration) calculated from the steering angle, the lateral acceleration, the lateral jerk, and the expression (1), and the vehicle speed. In FIG. 3(a), the state of the normal gain (FIG. 2) is represented by a broken line, and the state of the high gain is represented by a solid line.

As illustrated in FIG. 3(a), in the high gain state, the deceleration at the start of turning (point 1) is higher than the normal gain state. Therefore, the vehicle speed is lower than the normal gain state, and the lateral acceleration is smaller with respect to the same steering operation, so that the safety is improved while making a turn.

FIG. 3(b) is a g-g diagram illustrating acceleration and deceleration operation associated with the lateral motion, and illustrates a normal gain state (broken line) and a high gain state (solid line). In the high gain state, the graph is greatly extended in the x direction, and the y direction is affected by the speed reduction, and there is a tendency that the graph in the y direction is somewhat narrower.

In a case where the high gain state is used even during normal driving, a large acceleration and deceleration is generated even for a very small steering operation, and the driver and the passenger feel a stronger deceleration feeling and pitching motion. Therefore, usually, the gain $C_{xy}$ of the GVC is preferably adjusted to about 0.25, at which a balance between the control effect and feeling can be maintained.

In a case where the GVC is achieved with regenerative braking of the front wheels or the rear wheels, expected problems include the following.

(i) When two wheels (only the front wheels or only the rear wheels) are braked, a load ratio for the tires increases as compared with four-wheel braking, and therefore, a frictional limit of the tire is easily reached in a shorter time.

(ii) In the characteristics of the electric motors, the regenerative braking force is limited according to the rotation speed of the motor.

(iii) A high speed response of a motor is limited in order to suppress resonance caused by twisting of a drive shaft.

(iv) A regenerative braking force that can be received changes in accordance with a charging state of an electrical accumulator apparatus (SOC: State Of Charge).

As described above, except (i), it is a common problem for vehicles having regenerative braking device regardless of the number of motors, and in a case where a deceleration control according to the GVC is performed by using only the regenerative braking force, a target deceleration with the GVC may not be obtained.

In contrast, a friction braking device provided in each of the wheels hardly has any problem in varying the braking force because of the convenience at the vehicle side such as those shown in (i) to (iv), and in a situation where a certain level of frictional coefficient is ensured, a deceleration according to a command value can be generated.

<Verification of Maneuverability of Vehicle with GVC>

With a vehicle that can give a regenerative braking force to the left front wheel and the right front wheel, an actual car experiment is conducted on a dry asphalt road in order to evaluate the line trace performance and the maneuverability in a case where the GVC is applied.

Figure 4:
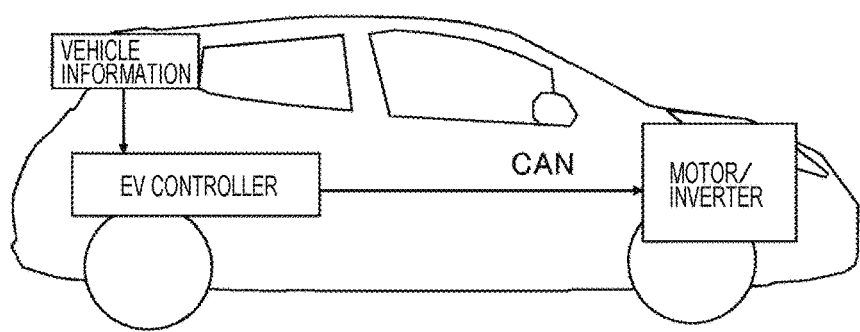
FIG. 4 is a figure illustrating a schematic configuration of a test car.

FIG. 4 is a figure illustrating a schematic configuration of a test car. The test car is a vehicle for driving the front wheels with a motor and an inverter, and the regenerative braking force affects only the left front wheel and the right front wheel, and does not affect the left rear wheel and the right rear wheel. The EV controller has a function of determining the target longitudinal acceleration $G_x$ expressed by the expression (1) from vehicle information about a vehicle speed, a steering angle, an acceleration pedal operation quantity, a brake pedal operation quantity, and the like. An EV controller is configured to send the target longitudinal acceleration $G_x$ via a CAN (Control Area Network) to the inverter, and control the braking and driving force with the motor.

Figure 5:
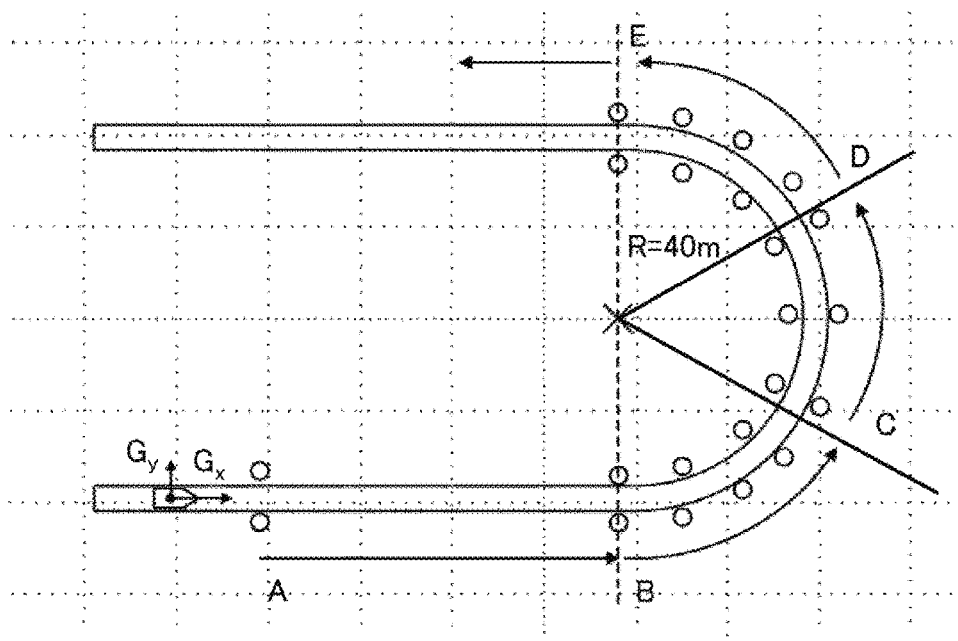
FIG. 5 is a figure illustrating an overview of a test course.

FIG. 5 is a figure illustrating an overview of a test course. In the test course, a section from a spot A to a spot B is a straight path constituted by a straight line portion, a section from a spot B to a spot E is a corner constituted by a semicircular curved portion having a radius of 40 meters, and a section beyond the spot E is a straight path constituted by a straight line portion. In the section from the spot B to the spot E, multiple pylons are disposed with a predetermined interval on each of an inside line having a radius of 38 meters and an outside line having a radius of 42 meters. A cruising lane is formed between the inside pylons and the outside pylons.

The test car starts to run from the spot A, and travels along the cruising lane from the spot B to the spot E, and thereafter, the vehicle runs in the straight path after the E spot. During the experiment, the driver was instructed to adjust the speed, at which the vehicle enters into the corner, to attain a designated vehicle speed (60, 70, 80 km/h), and run along the inside pylons as much as possible in the section from the spot B to the spot E. The driver is also instructed not to perform the brake operation while making a turn, and instructed to perform acceleration operation with arbitrary timing.

Figure 6:
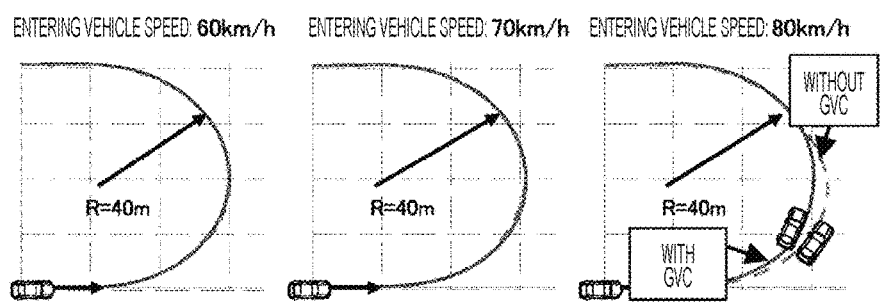
FIG. 6 is a figure obtained by generating, GPS measurement data, a cruising track of each of a case where the GVC is not performed (broken line in the figure) and a case where the GVC is performed (solid line in the figure) when the vehicle runs in the test course (see FIG. 5), and superimposing the cruising tracks.

FIG. 6 is a figure obtained by generating, GPS measurement data, a cruising track of each of a case where the GVC is not performed (broken line in the figure) and a case where the GVC is performed (solid line in the figure) when the vehicle runs in the test course (see FIG. 5), and superimposing the cruising tracks. FIG. 6 illustrates results of experiments where the speed at which the vehicle enters into the corner is 60, 70, 80 km/h, which are arranged from the left side in FIG. 6. At 60, 70 km/h, there was no difference between the cruising tracks. In contrast, at 80 km/h, the cruising tracks at the corner had a difference of up to 4 meters in the radius direction between a case where the GVC is performed and a case where the GVC is not performed. More specifically, this result indicates that, at 80 km/h, in a case where the GVC is not performed, the turning radius is larger, and the line trace cannot be appropriately performed.

In particular, at an early stage of the turn, the difference is larger. Not being able to appropriately perform the line trace at an early stage of the turn means that, when an emergency evasion is considered, there is a delay in a turning operation for avoiding an obstacle at first. As described above, in a case where the GVC is performed, the line trace can be appropriately performed even at 80 km/h, and it was found that the avoiding performance has greatly improved by performing the GVC rather than not performing the GVC.

Figure 7:
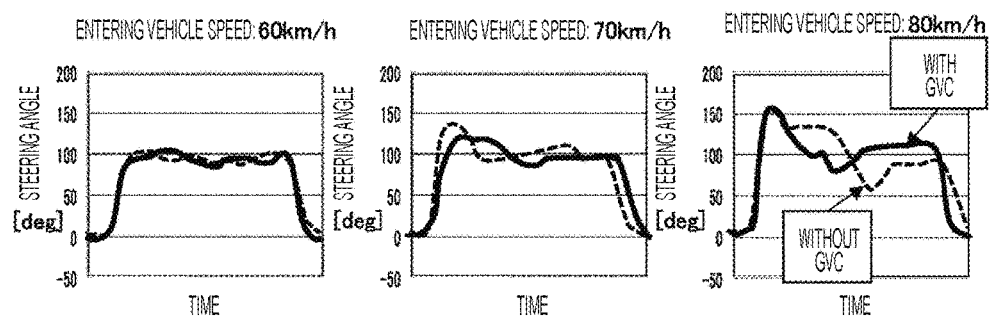
FIG. 7 is a figure illustrating a change of a steering angle between a case where the GVC is not performed (broken lines in the figure) and a case where the GVC is performed (solid lines in the figure) when the vehicle runs in the test course (see FIG. 5).

FIG. 7 is a figure illustrating a change of a steering angle [deg] between a case where the GVC is not performed (broken lines in the figure) and a case where the GVC is performed (solid lines in the figure) when the vehicle runs in the test course (see FIG. 5). FIG. 7 illustrates results of experiments where the speed at which the vehicle enters into the corner is 60, 70, 80 km/h, which are arranged from the left side in FIG. 7. When the entering vehicle speed is 60 km/h, there is hardly any difference between a case where the GVC is performed and a case where the GVC is not performed. In a case where the GVC is performed when the entering speed is 70 km/h, the magnitude (operation quantity) of the steering angle in the initial stage immediately after the vehicle enters into the corner is less than the magnitude thereof in a case where the GNC is not performed, and the variation of the steering angle is also smaller. More specifically, the driver can perform an appropriate line trace with a small additional steering turning operation quantity in a case where the GVC is performed than in a case where the GVC is not performed. In addition, a time rate of change in the steering angle can be smaller, which enables improving the maneuverability.

When the entering speed is 80 km/h, there is hardly any difference in changes of the steering angle at the initial stage immediately after the vehicle enters into the corner. In a case where the vehicle enters into a corner of which radius is substantially 40 meters at a high speed as fast as 80 km/h, originally, the steering operation should be quick and performed greatly, and the lateral jerk is also considered to be large. Therefore, in a case where the GVC, which is a deceleration control in proportional to the lateral jerk, is performed, a large deceleration is applied, so that a tire vertical load moves from the rear wheels to the front wheels, which allows the steering to be effective and reduces the vehicle speed. For this reason, in a case where a deceleration is realized in accordance with a command value with the GVC, the steering angle is expected to be greatly smaller than that of a case where the GVC is not performed. The difference between this prediction and the actual behavior will be explained later.

Figure 8A:
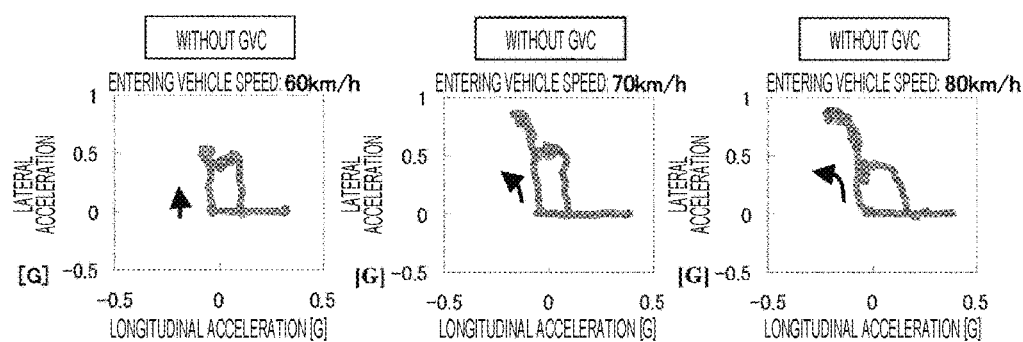
FIG. 8A is a g-g diagram in the case where the GVC is not performed when the vehicle runs in the test course (see FIG. 5)
Figure 8B:
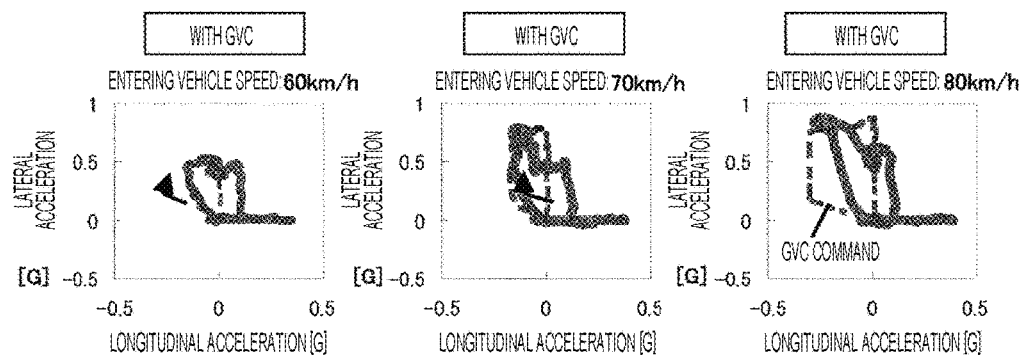
FIG. 8B is a g-g diagram in the case where the GVC is performed when the vehicle runs in the test course (see FIG. 5).

FIG. 8(a) is a g-g diagram in a case where the GVC is not performed when the vehicle runs in the test course (see FIG. 5). FIG. 8(b) is a g-g diagram in a case where the GVC is performed when the vehicle runs in the test course (see FIG. 5). FIG. 8(b) illustrates results of experiments where the speed at which the vehicle enters into the corner is 60, 70, 80 km/h, which are arranged from the left side in FIG. 8(b). In FIGS. 8(a) and 8(b), the horizontal axis (y axis) represents the magnitude of the longitudinal acceleration $G_x$ of the vehicle, and the vertical axis (y axis) represents the lateral acceleration $G_y$ of the vehicle.

In FIGS. 8(a) and 8(b), a solid line indicates a track of a composite acceleration of a lateral acceleration and a longitudinal acceleration measured by an acceleration sensor of a vehicle when the vehicle runs in a test course. In FIG. 8(b), a broken line indicates a track of a composite acceleration of an actually measured value of a lateral acceleration measured by an acceleration sensor of a vehicle when the vehicle runs in a test course and a command value of a target longitudinal acceleration $G_x$ obtained with the GVC. In FIG. 8(a), the command value of the target longitudinal acceleration $G_x$ is not generated.

As illustrated in FIG. 8(a), in a case where the GVC is not performed, and when the vehicle enters into a corner while the vehicle is applied with only a regenerative braking (about −0.02 G) corresponding to an engine brake (engine brake) generated by an operation for releasing the acceleration pedal (acceleration OFF state), then, the lateral acceleration rapidly increases, which makes a large transition in a straight line manner.

As illustrated in FIG. 8(b), in a case where the GVC is performed, the vehicle decelerates in association with a rise of the lateral acceleration at each of the entering speeds of 60, 70 km/h, and therefore, the transition in the initial stage of a turn is a smooth transition so as to draw an arc in the clockwise direction unique to the GVC. The transition also faithfully follows the command value of the GVC indicated by the broken line.

At the entering speed of 80 km/h, there is a large difference from the command value from the initial stage of the turn, and the transition changes in a straight line manner in a diagonally upward left direction in the g-g diagram from −0.15 G. As described above, this is considered to be mainly because of (ii) the regenerative braking force is limited in terms of the motor characteristics, and (iii) the high speed response is limited.

In a case of a task for tracing the test course as used this time, in general, the driver's steering operation becomes sharper as the vehicle speed becomes faster. Therefore, the rise of the lateral acceleration becomes sharper at the initial stage of the turn, and the lateral jerk becomes larger, and therefore, the longitudinal acceleration based on the GVC expressed by the expression (1) requires a larger and quicker response.

However, the electric motor has contradictory characteristics in such a manner that, as the vehicle speed becomes higher and the rotation speed of the motor becomes higher, the obtained regenerative braking force becomes smaller, and therefore, the regenerative braking force is limited, and the high speed response is also limited. With the test car, the deceleration based on the GVC cannot be sufficiently obtained at 80 km/h or higher, and as a result, nonlinear characteristics as illustrated in the graph of 80 km/h in FIG. 7 are considered to have emerged. Further, as described above, the test car is configured to perform the regenerative braking with only the front wheels. Therefore, as described above, it is not possible to rule out that (i) the frictional limitation of the tires has been reached and the cornering force of the front wheels have decreased because of the braking force.

Figure 9A:
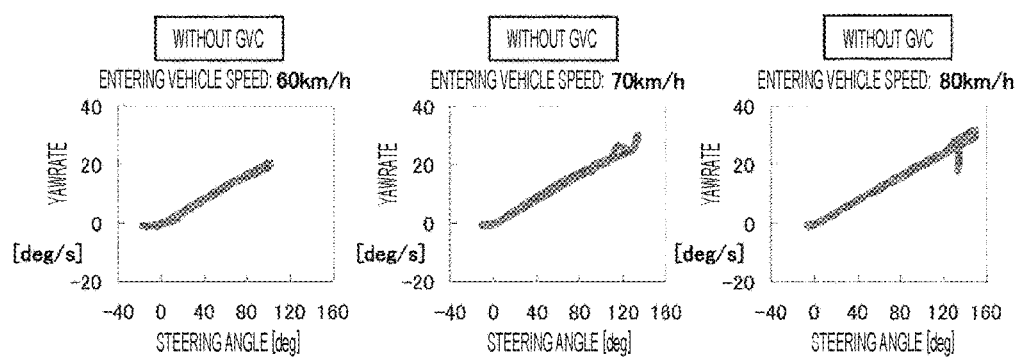
FIG. 9A is a figure illustrating a Lissajous waveform of a yawrate with respect to a steering angle of the steering in the case where the GVC is not performed when the vehicle runs in the test course (see FIG. 5)
Figure 9B:
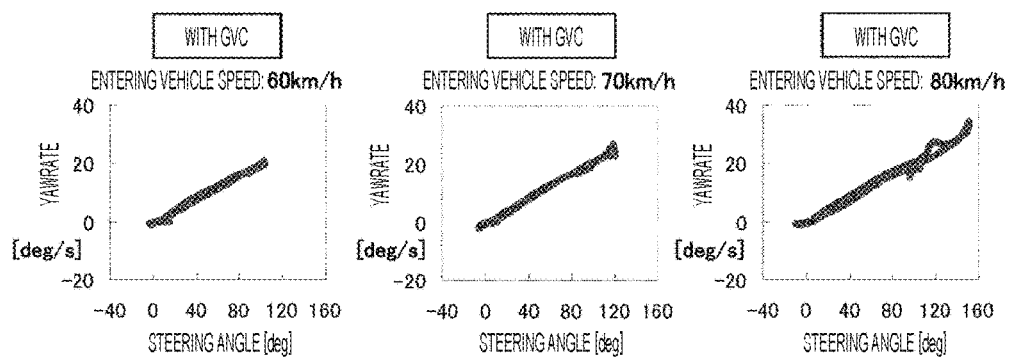
FIG. 9B is a figure illustrating a Lissajous waveform of a yawrate with respect to a steering angle of the steering in the case where the GVC is performed when the vehicle runs in the test course (see FIG. 5).

FIGS. 9(a) and 9(b) are figures illustrating a Lissajous waveform of a yawrate with respect to the steering angle of the steering. In FIG. 9, the horizontal axis represents the steering angle [deg], and the vertical axis represents the yawrate [deg/s]. FIG. 9(a) illustrates the Lissajous waveform of the yawrate with respect to the steering angle of the steering in a case where the GVC is not performed when the vehicle does not run in the test course (see FIG. 5). FIG. 9(b) illustrates the Lissajous waveform of the yawrate with respect to the steering angle of the steering in a case where the GVC is performed when the vehicle does not run in the test course (see FIG. 5).

Each of FIG. 9(a) and FIG. 9(b) illustrates results of experiments where the speed at which the vehicle enters into the corner is 60, 70, 80 km/h, which are arranged from the left side in FIG. 9(a) and FIG. 9(b). At 60 km/h, the linearity between the steering angle and the yawrate is maintained in any of the case where the GVC is not performed and the case where the GVC is performed.

At 70 km/h, in a case where the GVC is not performed, a nonlinearity can be seen at around 120 [deg], but the yawrate smoothly converges in a linear range. In contrast, in the case where the GVC is performed, the linearity is maintained. At 80 km/h, in the case where the GVC is not performed, the yawrate suddenly decreases and the linearity is almost lost at around 140 [deg], but the linearity is satisfied again. In the case where the GVC is performed, a nonlinearity can be seen at around 120 [deg], but the yawrate smoothly converges in a linear range.

As can be understood from the above, because of the effect of the GVC, at 70 km/h or less, the steering response characteristics can be considered to be held within the linear region. On the other hand, it should be noted that nonlinear characteristics slightly occur when the vehicle runs at 80 km/h. For example, when the nonlinear characteristics occur during emergency evasion, in order to obtain a yaw angle (singe integral of yawrate) and a lateral movement amount (double integral of the lateral acceleration) required for performing avoiding operation from the nonlinear relationship of the steering angle and the yawrate as illustrated in FIG. 9(b), there is a concern that, as illustrated in FIG. 7, the change of the steering angle may be the same as the case where the GVC is not performed.

As described above, in the case where the GVC is performed, at 70 km/h or less, it is confirmed that the emergency evasion performance has been improved as compared with the case where the GVC is not performed, but at 80 km/h, it is understood that there is a room for improvement in the emergency evasion performance.

As described above, as a result of various kinds of experiments and considerations, the inventors of the present application considered that, in the invention described in NPL 1, there is a room for improvement in the emergency evasion performance, and in order to improve the emergency evasion performance, a target of improvement of the emergency evasion performance can be achieved by solving the problem of not being able to achieve the deceleration according to the command value. Further, in order to solve such problem, the inventors of the present application have conceived of an operation control system using a friction braking device having braking force that is hardly affected by the conveniences of the vehicle such as (i) to (iv) explained above, wherein the operation control system determines a control value for determining the magnitude of each of the friction braking force and the regenerative braking force on the basis of a risk potential in a stage before the steering operation of the steering is performed and before the automatic brake is activated, so that the operation control system can generate a deceleration according to a command value even immediately after the steering operation is performed and immediately after the automatic brake is activated.

Hereinafter, embodiments of a vehicle having an operation control system according to the present invention will be explained with reference to drawings. The present invention can be applied to a hybrid electric vehicle driven by both of an engine and an electric motor (hereinafter referred to as a motor) and a pure electric vehicle running with only a motor. An example in which the present invention is applied to an electric vehicle (hereinafter referred to as a vehicle) will be explained.

First Embodiment

Figure 10:
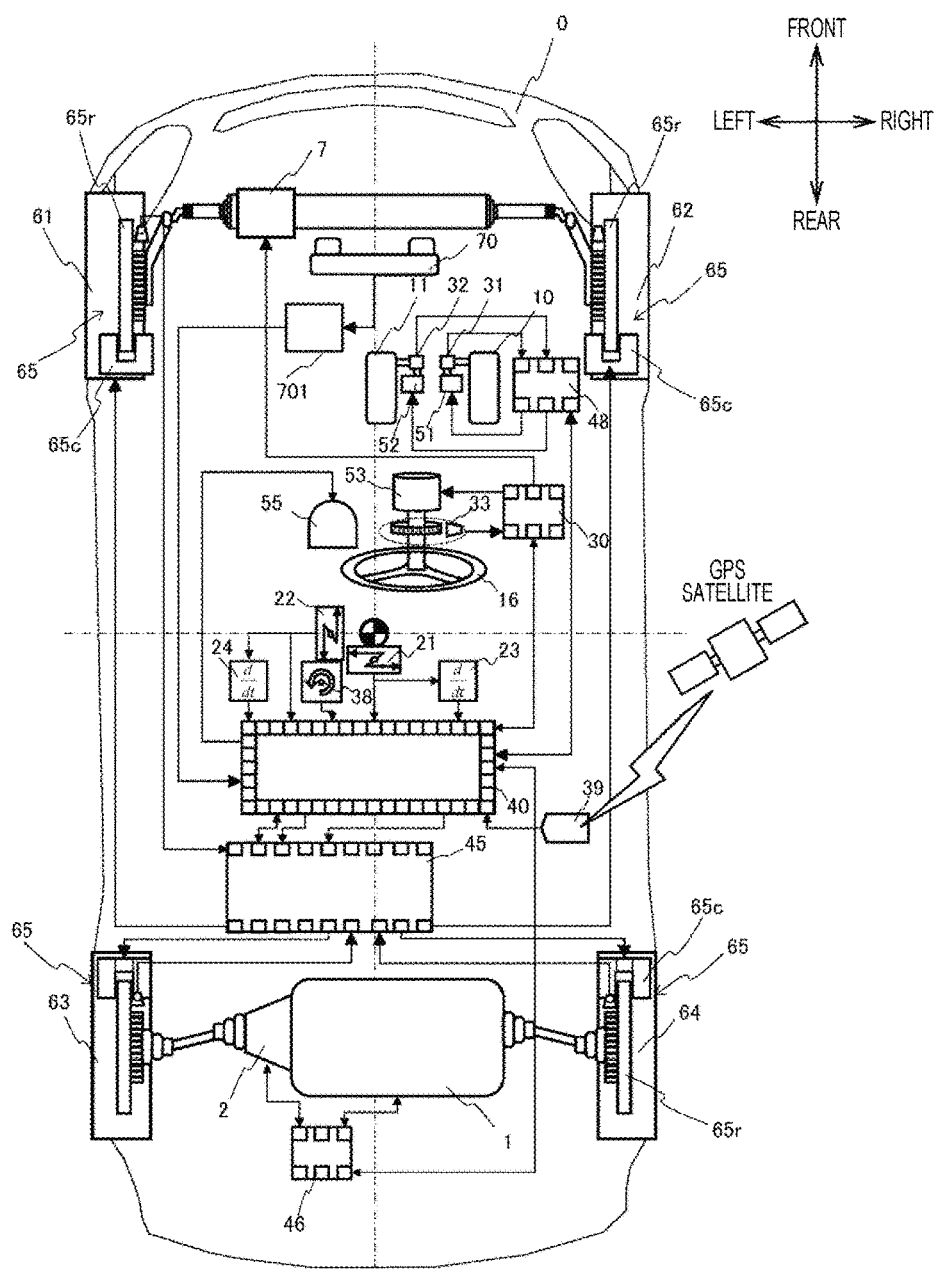
FIG. 10 is a figure illustrating an entire configuration of a vehicle according to a first embodiment of the present invention.

FIG. 10 is a figure illustrating an entire configuration of a vehicle 0 according to the first embodiment of the present invention. In FIG. 10, an electrical accumulator apparatus having multiple electrical accumulator devices such as a secondary battery, a capacitor, and the like is not shown in the figures. The vehicle 0 is constituted by a so-called by-wire system in which an operation member of a driver is not mechanically coupled with each of a steering mechanism, an acceleration mechanism, and a deceleration mechanism. More specifically, the vehicle 0 is configured to be driven automatically. It should be noted that only the operation member of the driver and the steering mechanism may be mechanically coupled, and the steering angle may be configured to be adjusted directly by the driver.

The vehicle 0 is a rear wheel drive car (Rear Motor Rear Drive: RR layout) in which a motor 1 drives a left rear wheel 63 and a right rear wheel 64 (which may also be hereinafter collectively referred to as rear wheels). Each of a left front wheel 61, a right front wheel 62, the left rear wheel 63, and the right rear wheel 64 (which may also be hereinafter collectively referred to as wheels) is provided with a wheel speed detection rotor, and a wheel speed pickup is provided at a vehicle side in proximity to each of the wheels, so that the wheels are configured to be able to detect the wheel speed of each of the wheels. Information about the wheel speed is input into a friction brake controller 45 explained later, so that a vehicle speed V is calculated.

The vehicle 0 includes an acceleration pedal sensor 31, a brake pedal sensor 32, a pedal controller 48, an ADAS (Advanced driver assistance system) controller 40, and a power train controller 46.

The acceleration pedal sensor 31 detects a depress operation quantity of the acceleration pedal 10 of the driver (hereinafter referred to as an acceleration operation quantity) and a pedal angle speed which is an operation speed in a direction for releasing the acceleration pedal 10. A signal representing the acceleration operation quantity detected by the acceleration pedal sensor 31 is input into the ADAS controller 40 via the pedal controller 48. The acceleration pedal 10 is connected to an acceleration pedal counterforce motor 51 generating a counterforce against the depress operation of the acceleration pedal 10. The counterforce generated by the acceleration pedal counterforce motor 51 is adjusted by the pedal controller 48 controlled according to a command given by the ADAS controller 40.

The brake pedal sensor 32 detects the depress operation quantity of the brake pedal 11 by the driver (hereinafter referred to as a brake operation quantity) and the pedal, angle speed which is an operation speed in a direction for depressing the brake pedal 11. A signal representing the brake operation quantity detected by the brake pedal sensor 32 is input into the ADAS controller 40 of the pedal controller 48. The brake pedal 11 is connected to the brake pedal counterforce motor 52 generating a counterforce against the depress operation of the brake pedal 11. The counterforce generated by the brake pedal counterforce motor 52 is adjusted by the pedal controller 48 controlled according to a command given by the ADAS controller 40.

The vehicle 0 is provided with the friction braking device 65 in association with each of the wheels (four wheels). The friction braking device 65 is configured to include a brake roller 65r provided at a wheel side and a caliper 65c provided at a vehicle body side. The caliper 65c generates a friction braking force by sandwiching the brake roller 65r between pads, thus decelerating the wheels.

The caliper 65c employs a hydraulic type caliper or an electric type caliper having an electric motor for each caliper. In a case of a hydraulic type, instead of a well-known negative pressure booster, it may be possible to use an electric actuator using a simple method for generating a master cylinder hydraulic pressure by using a coreless motor and a ball screw provided inside thereof as an actuator and capable of ensuring a required friction braking force with natural pedal feeling by cooperating with the regenerative brake achieved with the driving motor 1 of the vehicle. Alternatively, it may be possible to employ a configuration for making a pressure with a multi-cylinder plunger pump and a gear pump according to ESC (Electronic Stability Control) supporting the ITS (Intelligent Transport Systems).

The ADAS controller 40 determines a frictional braking target deceleration and a regenerative braking target deceleration on the basis of vehicle information such as an acceleration operation quantity and a brake operation quantity, external environment information, and the like, and outputs the frictional braking target deceleration and the regenerative braking target deceleration to the friction brake controller 45 and the power train controller 46, respectively. Each of the ADAS controller 40, the friction brake controller 45, and the power train controller 46 includes an arithmetic processing device including a CPU, a storage device, e.g., a ROM and a RAM, other peripheral circuits, and the like.

When each caliper 65c is operated in accordance with a control signal that is output from the friction brake controller 45, the friction braking force is given to the vehicle 0. The power train controller 46 outputs a control signal to an inverter, not shown, in accordance with a command representing a target longitudinal acceleration that is output from the ADAS controller 40, and controls the motor 1 with the inverter to perform power running and regenerative running. When the regenerative running is performed, the regenerative braking force is given to the vehicle 0.

The rotation torque that is output from the motor 1 is transmitted via the electric control transmission 2 to each of the left rear wheel 63 and the right rear wheel 64. The electric control transmission 2 is controlled by the power train controller 46.

The steering system of the vehicle 0 includes a front wheels steering apparatus for driving the left front wheel 61 and the right front wheel 62 (hereinafter collectively referred to as front wheels) in accordance with driver's steering operation. The front wheels steering apparatus includes a steering 16 operated by the driver, a steering angle sensor 33 detecting the steering angle and the steering angle speed of the steering 16, a power steering 7 having a steered angle sensor (not shown) for detecting the steered angle of the front wheels, and a steering controller 30. As described above, the front wheels steering apparatus has a so-called steer-by-wire structure in which there is no mechanical coupling between the steering 16 and the power steering 7.

A signal representing a steering angle of the steering 16 detected by the steering angle sensor 33 is input into the ADAS controller 40 via the steering controller 30. The steering controller 30 controls the power steering 7 in accordance with the steering angle detected by the steering angle sensor 33, and adjusts the steered angle of the front wheels. The steering 16 is connected to a steer-counterforce motor 53 generating a counterforce against steering operation of the steering 16. The counterforce generated by the steer-counterforce motor 53 is adjusted by the steering controller 30 controlled by a command given by the ADAS controller 40.

The vehicle 0 includes a lateral acceleration sensor 21 detecting the lateral acceleration of the vehicle 0, a longitudinal acceleration sensor 22 detecting the longitudinal acceleration of the vehicle 0, and a yawrate sensor 38 detecting the yawrate of the vehicle 0. As shown in the figure, the lateral acceleration sensor 21, the longitudinal acceleration sensor 22, and the yawrate sensor 38 are disposed in proximity to the gravity center point of the vehicle 0.

The lateral acceleration sensor 21 includes a differential circuit 23 deriving the lateral jerk $G_y\_dot$ by differentiating the detected lateral acceleration $G_y$, and the longitudinal acceleration sensor 22 includes a differential circuit 24 deriving the longitudinal jerk by differentiating the detected longitudinal acceleration. Signals representing the lateral acceleration, the lateral jerk, the longitudinal acceleration, the longitudinal jerk, and the yawrate are input into the ADAS controller 40. It should be noted that the differential circuits 23, 24 are not limited to the case where the sensors 21, 22 are provided. Instead of providing the differential circuits 23, 24 in the sensors 21, 22, an acceleration signal may be directly input into the ADAS controller 40 from the sensors 21, 22, so that the ADAS controller 40 executes differential processing on each of the lateral acceleration and the longitudinal acceleration to derive the lateral jerk and the longitudinal jerk.

It should be noted that the method for deriving the lateral jerk and the longitudinal jerk is not limited to the method for differentiating and deriving the lateral acceleration and the longitudinal acceleration explained above. For example, as illustrated in NPL 1, the lateral jerk may be derived by using the estimated yawrate and the lateral acceleration using the vehicle speed, the steering angle, and the vehicle operation model, and they may be combined and used in accordance with processing such as select-high. The vehicle of NPL 1 is configured to improve the estimation precision based on the vehicle operation model by using the signal of the yawrate sensor 38.

The GPS (Global Positioning System) navigation sensor 39 collates the position information obtained from the GPS satellites with dynamic map data distributed via communication, and obtains external environment information such as information about a course shape such as a curvature of a corner in front of the vehicle, information about a traffic light, road sign information, inclination information, and the like to the ADAS controller 40.

Further, the vehicle 0 is provided with a stereo camera 70 and a stereo image processing apparatus 701. The stereo camera 70 is constituted by a pair of right and left CCD (Charge Coupled Device) cameras.

For example, the pair of right and left CCD cameras constituting the stereo camera 70 are disposed in such a form as to sandwich a rear view mirror (not shown) in the cabin, and the stereo camera 70 individually capture images of an object existing in front of the vehicle 0 from different coordinates of a vehicle fixed system, and outputs image information to the stereo image processing apparatus 701. Instead of the CCD camera, a CMOS (Complementary Metal Oxide Semiconductor) camera may be employed.

A signal representing a vehicle speed V is input into the stereo image processing apparatus 701 from the friction brake controller 45 via the ADAS controller 40. The stereo image processing apparatus 701 recognizes information about an object, a white line, and the like existing in front of the vehicle 0 to estimate the cruising lane of the vehicle on the basis of the captured image information and information about a vehicle speed V. Information obtained by the stereo image processing apparatus 701 is input into the ADAS controller 40.

The stereo image processing apparatus 701 detects whether there is an object such as an obstacle, a preceding vehicle, and the like on a path along which the vehicle 0 is going to run, and recognizes, as an obstacle for which collision prevention control is executed, one of multiple detected objects whichever is closest to the vehicle 0, and outputs the obstacle to the ADAS controller 40. The stereo image processing apparatus 701 identifies the object recognized as the obstacle, and derives a relative speed from the magnitude thereof, the relative position from the vehicle 0, and the time change thereof, and outputs the information to the ADAS controller 40. It should be noted that the relative speed and the relative position may be configured to be detected by a millimeter-wave radar or a laser radar.

The vehicle 0 is provided with an HVI (Human Vehicle Interface) 55 for notifying system activation information as information for assisting the driver with driving. The HVI 55 is constituted by a display apparatus, an audio output apparatus, and the like, and as explained later, the HVI 55 notifies the state of the vehicle (the magnitude of the risk potential) to the driver by using a warning image which is output to a display screen of a display apparatus, and a warning sound which is output from the audio output apparatus. In addition, the HVI 55 conveys the activation information about the system to the driver.

Figure 11:
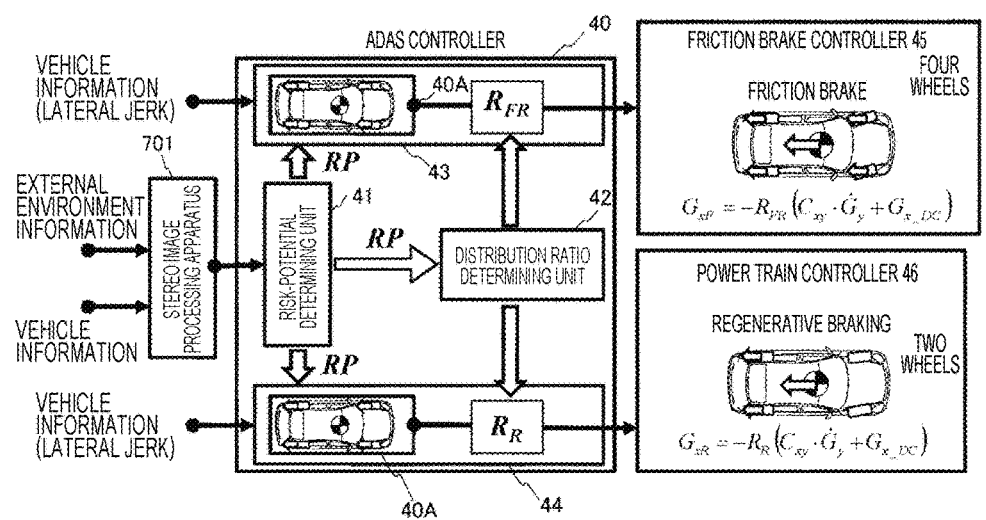
FIG. 11 is a functional block diagram illustrating an ADAS controller, a friction brake controller, and a power train controller.

FIG. 11 is a functional block diagram illustrating the ADAS controller 40, the friction brake controller 45, and the power train controller 46. When the friction brake controller 45 receives the frictional braking target deceleration $G_{xF}$ that is output from the ADAS controller 40 on the basis of input and output information of the I/O port of the CAN, the deceleration of the vehicle 0 can be controlled with the friction braking force generated by the friction braking device 65. When the power train controller 46 receives the regenerative braking target deceleration $G_{xR}$ that is output from the ADAS controller 40 on the basis of the input and output information of the I/O port of the CAN, and deceleration of the vehicle 0 can be controlled with the regenerative braking force generated by the motor 1.

The ADAS controller 40 is functionally provided with a risk-potential determining unit 41, a distribution ratio determining unit 42, a friction braking deceleration determining unit 43, and a regenerative braking deceleration determining unit 44. Each of the friction braking deceleration determining unit 43 and the regenerative braking deceleration determining unit 44 has a longitudinal acceleration determining unit 40A determining the target longitudinal acceleration Gx on the basis of the expression (1). More specifically, the present embodiment has the same configuration as that of NPL 1 explained above, and can perform the GVC.

The risk-potential determining unit 41 determines the risk potential RP of the vehicle 0 on the basis of at least one of the external environment information and the vehicle information. Hereinafter, a quantitative evaluation method of the risk potential RP will be explained. In the present embodiment, the risk potential RP is determined by using a reciprocal number $(1/t_c)$ of a time-to-collision (TTC: Time-To-Collision) tc obtained from the external environment information and the vehicle information.

Figure 12:
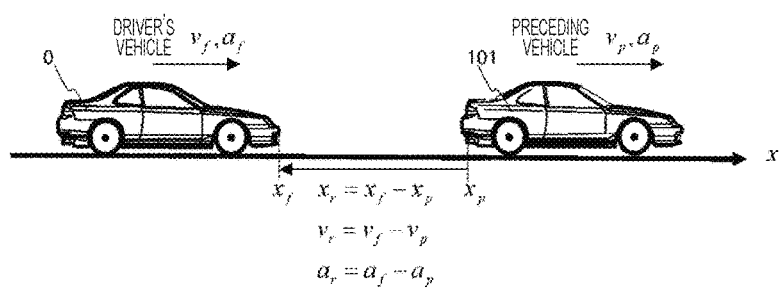
FIG. 12 is a figure illustrating a relative relationship between the driver's vehicle and a preceding vehicle.

FIG. 12 is a figure illustrating a relative relationship between the driver's vehicle (i.e., the vehicle 0) and the preceding vehicle 101. As illustrated in FIG. 12, in a case where the preceding vehicle 101 is running in front of the vehicle 0 running in the x direction, the position of the vehicle 0 is indicated by xf, the vehicle speed by vf, let the acceleration by af, the position of the preceding vehicle 101 by xp, the vehicle speed by vp, and the acceleration by ap. In this case, the relative distance xr, the relative speed vr, and the relative acceleration ar are expressed by the following expressions.

$$xr=xf-xp$$

$$vr=vf-vp$$

$$ar=af-ap$$

A captured image of an object existing in front of the vehicle 0, i.e., the external environment information, and the relative distance xr and the relative speed vr obtained from the vehicle speed V, i.e., the vehicle information, are input into the ADAS controller 40 from the stereo image processing apparatus 701 as described above.

The reciprocal number (1/tc) of the time-to-collision $t_c$ is expressed by the expression (3).

[Math 4]

$$\frac{1}{t_c} = -\frac{v_r}{x_r} \quad (3)$$

$1/t_c$ which is a reciprocal number of a time-to-collision is an index equivalent to a time change of an increasing rate of the magnitude of an obstacle such as the preceding vehicle 101 (visual sensation of the preceding vehicle) or a time change of logarithm of a vehicular gap (the relative distance between the vehicle 0 and an obstacle in front of the vehicle 0). $1/t_c$ tends to increase as the vehicle 0 comes closer to the obstacle such as the preceding vehicle 101.

The risk-potential determining unit 41 calculates the reciprocal number $(1/t_c)$ of the time-to-collision from the expression (3) on the basis of the relative distance xr and the relative speed vr.

Figure 13A:
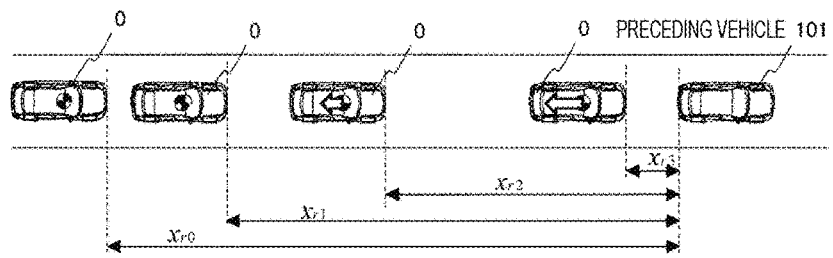
FIG. 13A is a figure illustrating a relative distance between the driver's vehicle and a preceding vehicle.
Figure 13B:
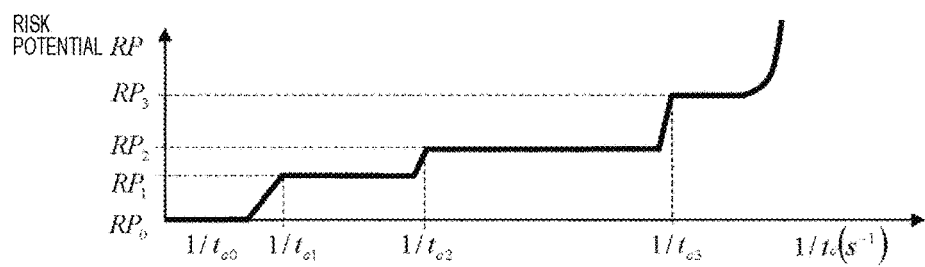
FIG. 13B is a figure illustrating a relationship between a reciprocal number of a time-to-collision and a risk potential.

FIG. 13(a) is a figure illustrating the relative distance xr between the driver's vehicle and the preceding vehicle. FIG. 13(b) is a figure illustrating a relationship of between the reciprocal number $(1/t_c)$ of the time-to-collision and the risk potential RP. It should be noted that the relative speed vr is considered to be the same value at each of the driver's vehicle positions as illustrated in FIG. 13(a). As illustrated in FIG. 13(a), when the relative distance xr to the preceding vehicle 101 decreases to xr0, xr1, xr2, and xr3, $1/t_c$ increases to $1/t_{c0}$, $1/t_{c1}$, $1/t_{c2}$, and $1/t_{c3}$. The risk potential increases as $1/t_c$ increases.

The storage device of the ADAS controller 40 previously stores, in a look up table format, characteristics of the risk potential RP with respect to $1/t_c$ as illustrated in FIG. 13(b). The increment characteristics of the risk potential RP with respect to $1/t_c$ are determined so as to change in a stepwise manner as indicated by a solid line in the figure.

The risk-potential determining unit 41 refers to the characteristics of the risk potential RP (see FIG. 13(b)), and reads the risk potential RP corresponding to $1/t_c$.

In a case where $1/t_{c0} < 1/t_c < 1/t_{c1}$ is satisfied, the risk potential RP is determined to be $RP_0$. In a case where $1/t_{c1} \leq 1/t_c < 1/t_{c2}$ is satisfied, the risk potential RP is determined to be $RP_1$. In a case where $1/t_{c2} \leq 1/t_c < 1/t_{c3}$ is satisfied, the risk potential RP is determined to be $RP_2$. In a case where $1/t_{c3} \leq 1/t_c$ is satisfied, the risk potential RP is determined to be $RP_3$. The magnitude relationship of $1/t_{c0}$, $1/t_{c1}$, $1/t_{c2}$, $1/t_{c3}$ is as follows: $1/t_{c0} < 1/t_{c1} < 1/t_{c2} < 1/t_{c3}$. The magnitude relationship of $RP_0$, $RP_1$, $RP_2$, $RP_3$ is as follows: $RP_0 < RP_1 < RP_2 < RP_3$.

As illustrated in FIG. 11, information about the risk potential RP determined by the risk-potential determining unit 41 is output to each of the distribution ratio determining unit 42, the friction braking deceleration determining unit 43, and the regenerative braking deceleration determining unit 44, and the HVI 55 (see FIG. 10).

The distribution ratio determining unit 42 determines the distribution ratio of each of the friction braking force and the regenerative braking force in order to distribute the total braking force applied to the vehicle 0 into the friction braking force and the regenerative braking force. The distribution ratio determining unit 42 determines a distribution ratio $R_{FR}$ of the friction braking force and a distribution ratio $R_R$ of the regenerative braking force on the basis of the risk potential RP determined by the risk-potential determining unit 41.

Figure 14:
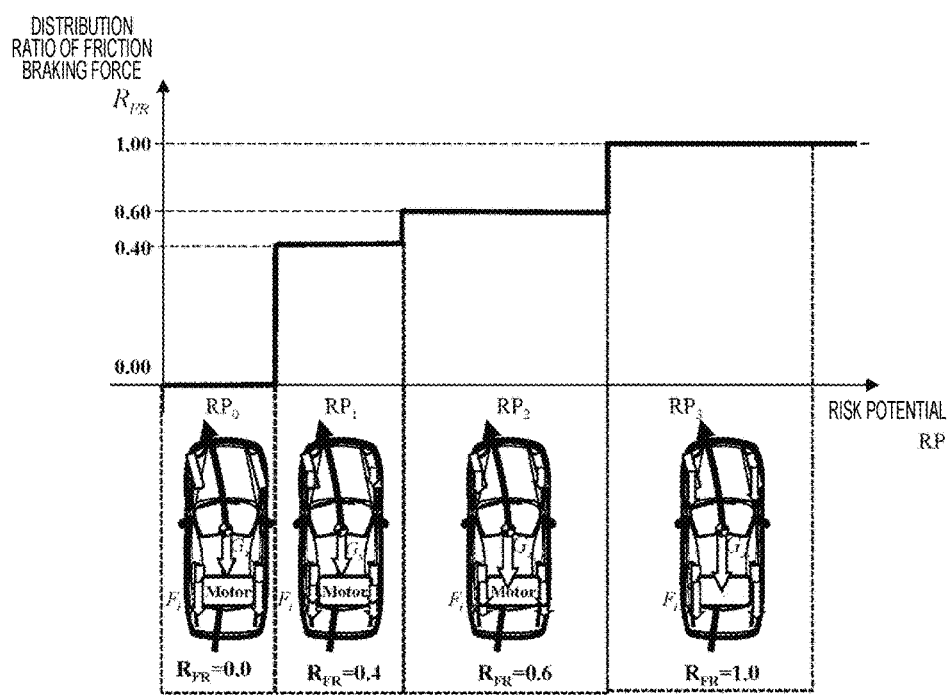
FIG. 14 is a figure illustrating a relationship between a risk potential and a distribution ratio of friction braking force.

FIG. 14 is a figure illustrating a relationship between the risk potential RP and the distribution ratio $R_{FR}$ of the friction braking force. The storage device of the ADAS controller 40 previously stores, in a look up table format, characteristics of the distribution ratio $R_{FR}$ of the friction braking force with respect to the risk potential RP as illustrated in FIG. 14. The distribution ratio determining unit 42 refers to the table of the distribution ratio $R_{FR}$ (see FIG. 14), and reads the distribution ratio $R_{FR}$ of the friction braking force corresponding to the risk potential RP determined by the risk-potential determining unit 41.

It should be noted that the relationship between the distribution ratio $R_{FR}$ of the friction braking force and the distribution ratio $R_R$ of the regenerative braking force is expressed by the following expression.

$$R_{FR}+R_R=1$$

The distribution ratio determining unit 42 calculates the distribution ratio $R_R$ of the regenerative braking force from the distribution ratio $R_{FR}$ read from the table in accordance with the following expression.

$$R_R=1-R_{FR}$$

In a case where the value of the risk potential RP is $RP_0$, the distribution ratio determining unit 42 lets the value of the distribution ratio $R_{FR}$ of the friction braking force be 0.0 ($R_{FR}$=0.0), and lets the value of the distribution ratio $R_R$ of the regenerative braking force be 1.0 ($R_R$=1.0). In a case where the value of the risk potential RP is $RP_1$, the distribution ratio determining unit 42 lets the value of the distribution ratio $R_{FR}$ of the friction braking force be 0.4 ($R_{FR}$=0.4), and lets the value of the distribution ratio $R_R$ of the regenerative braking force be 0.6 ($R_R$=0.6).

In a case where the value of the risk potential RP is $RP_2$, the distribution ratio determining unit 42 lets the value of the distribution ratio $R_{FR}$ of the friction braking force be 0.6 ($R_{FR}$=0.6), and lets the value of the distribution ratio $R_R$ of the regenerative braking force be 0.4 ($R_R$=0.4). In a case where the value of the risk potential RP is $RP_3$, the distribution ratio determining unit 42 lets the value of the distribution ratio $R_{FR}$ of the friction braking force be 1.0 ($R_{FR}$=1.0), and lets the value of the distribution ratio $R_R$ of the regenerative braking force be 0.0 ($R_R$=0.0).

More specifically, as the risk potential RP becomes higher, the distribution ratio $R_{FR}$ of the friction braking force becomes larger, and the distribution ratio $R_R$ of the regenerative braking force becomes smaller.

As illustrated in FIG. 11, information about the distribution ratio $R_{FR}$ of the friction braking force determined by the distribution ratio determining unit 42 is output to the friction braking deceleration determining unit 43, and information about the distribution ratio $R_R$ of the regenerative braking force determined by the distribution ratio determining unit 42 is output to the regenerative braking deceleration determining unit 44.

The longitudinal acceleration determining unit 40A of the friction braking deceleration determining unit 43 and the regenerative braking deceleration determining unit 44 determines a precrash brake deceleration $G_{x\_DC\_R}$ in accordance with the risk potential RP determined by the risk-potential determining unit 41.

Figure 15:
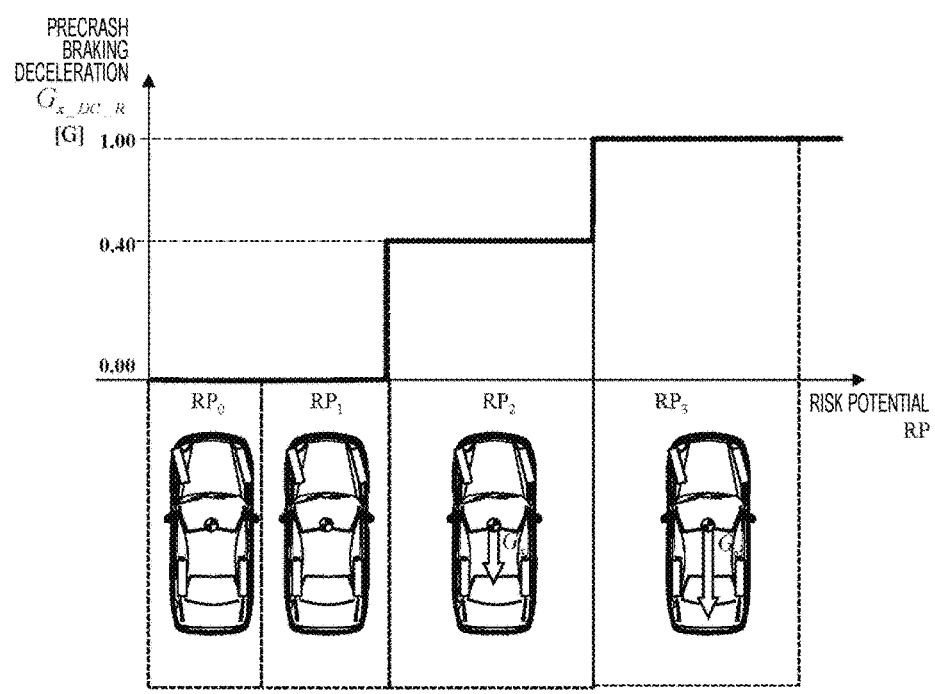
FIG. 15 is a figure illustrating a relationship between the risk potential and precrash brake deceleration.

FIG. 15 is a figure illustrating a relationship between the risk potential RP and the precrash brake deceleration. The storage device of the ADAS controller 40 previously stores, in a look up table format, the characteristics of the precrash brake deceleration $G_{x\_DC\_R}$ with respect to the risk potential RP as illustrated in FIG. 15. The increment characteristics of the deceleration $G_{x\_DC\_R}$ with respect to the risk potential RP are determined so as to change in a stepwise manner as indicated by a solid line in the figure.

The longitudinal acceleration determining unit 40A refers to the table of the precrash brake deceleration $G_{x\_DC\_R}$ (see FIG. 15), and reads the precrash brake deceleration $G_{x\_DC\_R}$ corresponding to the risk potential RP determined by the risk-potential determining unit 41.

In a case where the value of the risk potential RP is $RP_0$ and $RP_1$, the longitudinal acceleration determining unit 40A determines that it is not necessary to activate the automatic brake for collision avoidance, and lets the value of the deceleration $G_{x\_DC\_R}$ be 0.00 [G] ($G_{x\_DC\_R}$=0.00). In a case where the value of the risk potential RP is $RP_2$, the longitudinal acceleration determining unit 40A lets the value of the deceleration $G_{x\_DC\_R}$ be 0.40 [G] ($G_{x\_DC\_R}$=0.40), and in a case where the value of the risk potential RP is $RP_3$, the longitudinal acceleration determining unit 40A lets the value of the deceleration $G_{x\_DC\_R}$ be 1.00 [G] ($G_{x\_DC\_R}$=1.00). More specifically, as the risk potential RP is higher, the longitudinal acceleration determining unit 40A determines that the deceleration $G_{x\_DC\_R}$ is of a higher value.

It should be noted that $G_{x\_DC}$ expressed by the expressions (1) and (2) is derived from a summation of the precrash brake deceleration $G_{x\_DC\_R}$ and the longitudinal acceleration $G_{x\_DC\_D}$ derived in accordance with the driver's operation for operating the brake pedal 11 and the driver's operation for operating the acceleration pedal 10. In the present embodiment, for the sake of explanation, it is assumed that the value of the longitudinal acceleration $G_{x\_DC\_D}$ derived in accordance with the driver's operation for operating the brake pedal 11 and the driver's operation for operating the acceleration pedal 10 is zero, and more specifically, the driver does not perform any pedal operation.

The longitudinal acceleration determining unit 40A determines the target longitudinal acceleration $G_x$ in accordance with the expression (1) on the basis of the precrash brake deceleration $G_{x\_DC\_R}$, the lateral acceleration $G_y$ detected by the lateral acceleration sensor 21, and the lateral jerk $G_{y\_}$ dot derived by the differential circuit 23.

In a case where the risk potential RP is $RP_0$, it is less likely to assist rapid lateral movement caused by steering operation performed for emergency evasion, and therefore, it is important that the magnitude of the longitudinal acceleration associated with the lateral motion (the first term at the right-hand side of the expression (1)) stays within a range in which a roll caused by lateral motion and a pitch caused by longitudinal operation do not give uncomfortable feeling to the driver. In the present embodiment, in order to obtain a preferable feeling in a case where the value of the risk potential RP is $RP_0$, the gain $C_{xy}$ is set to 0.25 (constant value). The gain $C_{xy}$ is previously stored in the storage device of the ADAS controller 40.

As illustrated in FIG. 11, the friction braking deceleration determining unit 43 multiplies the target longitudinal acceleration $G_x$ by the distribution ratio $R_{FR}$ of the friction braking force to derive the frictional braking target deceleration $G_{xF}$, and outputs the frictional braking target deceleration $G_{xF}$ to the friction brake controller 45. The frictional braking target deceleration $G_{xF}$ is expressed by the expression (4).

[Math 5]

$$G_{xF}=-R_{FR}(C_{xy}\cdot\dot{G}_y+G_{x\_DC\_R})\cdot\dot{G}_y=G_{y\_dot} \qquad (4)$$

The regenerative braking deceleration determining unit 44 multiplies the target longitudinal acceleration $G_x$ by the distribution ratio $R_R$ (=1−$R_R$) of the regenerative braking force to derive the regenerative braking target deceleration $G_{xR}$, and outputs the regenerative braking target deceleration $G_{xR}$ to the power train controller 46. The regenerative braking target deceleration $G_{xR}$ is expressed by the expression (5).

[Math 6]

$$G_{xR} = -(1-R_{FR})(C_{xy} \cdot \dot{G}_y + G_{x\_DC\_R}) \cdot X \cdot \dot{G}_y = G_{y\_dot} \quad (5)$$

The friction brake controller 45 controls the caliper 65c constituting the friction braking device 65 on the basis of the frictional braking target deceleration $G_{xF}$, and generates the friction braking force. The power train controller 46 generates the regenerative braking force on the basis of the regenerative braking target deceleration $G_{xR}$. The friction brake controller 45 and the power train controller 46 control the friction braking device 65 and the motor 1 so that the longitudinal acceleration actually applied to the vehicle 0 attains the target longitudinal acceleration $G_x$ (command value).

Figure 16:
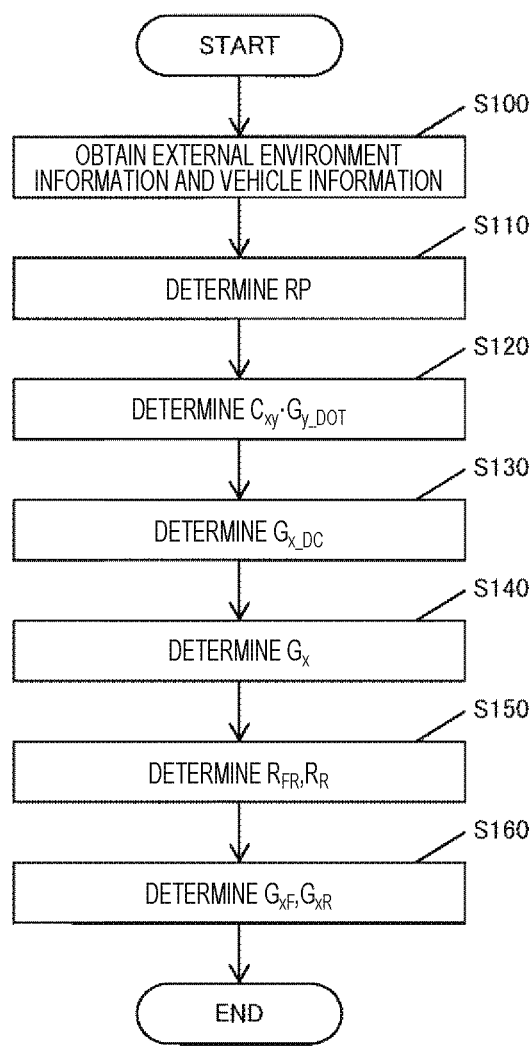
FIG. 16 is a flowchart illustrating operation of determination control processing of the distribution ratio of each of the friction braking force and the regenerative braking force with an ADAS controller.

Hereinafter, the determining control of the distribution ratio of each of the friction braking force and the regenerative braking force by the ADAS controller 40 will be explained with reference to the flowchart of FIG. 16. FIG. 16 is a flowchart illustrating an operation of determining control processing of the distribution ratio of each of the friction braking force and the regenerative braking force by the ADAS controller 40. When an ignition switch (not shown) is turned ON, an initial determination, not shown, is performed, and thereafter, a program for performing processing as illustrated in FIG. 16 is activated, and the ADAS controller 40 repeatedly executes processing in steps S100 to S160 for each predetermined control cycle. The program performing processing as illustrated in FIG. 16 is stored in the storage device of the ADAS controller 40.

In step S100 (information obtaining processing), the ADAS controller 40 obtains the external environment information and the vehicle information, and proceeds to step S110.

In step S110 (risk potential determination processing), the ADAS controller 40 calculates a reciprocal number (1/tc) of the time-to-collision in accordance with the expression (3), refers to the table as illustrated in FIG. 13(b), reads the risk potential RP corresponding to 1/tc thus calculated, and proceeds to step S120.

In step S120, the ADAS controller 40 determines the longitudinal acceleration ($C_{xy} \cdot G_{y\_}$dot) associated with the lateral motion on the basis of the lateral jerk which is the vehicle information obtained in step S100, and proceeds to step S130.

In step S130, the ADAS controller 40 reads, from the table as illustrated in FIG. 15, the longitudinal acceleration $G_{x\_DC}$ not associated with the lateral motion corresponding to the risk potential RP determined in step S110, and proceeds to step S140. $G_{x\_Dc}$ is derived from a summation of $G_{x\_DC\_R}$ determined on the basis of the risk potential RP and $G_{x\_DC\_D}$ determined on the basis of the operation quantity of the acceleration pedal 10 and the operation quantity of the brake pedal 11 performed by the driver, but in this case, it is assumed that the driver does not perform any pedal operation ($G_{x\_DC\_D}$=0).

In step S140, the ADAS controller 40 adds $C_{xy} \cdot G_{y\_}$ dot determined in step S120 and $G_x$ D determined in step S130 to derive the target longitudinal acceleration $G_x$, and proceeds to step S150.

In step S150, the ADAS controller 40 determines the distribution ratio $R_R$ of the friction braking force and the distribution ratio $R_R$ of the regenerative braking force on the basis of the risk potential RP determined in step S110 (see FIG. 14), and proceeds to step S160.

In step S160, the ADAS controller 40 multiplies the distribution ratio $R_{FR}$ of the friction braking force determined in step S150 and the target longitudinal acceleration $G_x$ derived in step S140 to derive the frictional braking target deceleration $G_xF$. In step S160, the ADAS controller 40 multiplies the distribution ratio $R_R$ of the regenerative braking force determined in step S150 and the target longitudinal acceleration $G_x$ derived in step S140 to derive the regenerative braking target deceleration $G_{xR}$. The ADAS controller 40 outputs the frictional braking target deceleration $G_{xF}$ to the friction brake controller 45, and outputs the regenerative braking target deceleration $G_{xR}$ to the power train controller 46. It should be noted that the sequence of each processing is not limited to this sequence illustrated in the flowchart.

FIG. 17(a) is a figure illustrating a correspondence table between a quantitative risk potential RP and an evaluation index of the qualitative risk potential. As illustrated in FIG. 17(a), in a case where the value of the risk potential RP is $RP_0$ (RP=$RP_0$), it is evaluated that there is no possibility of collision. In a case where the value of the risk potential RP is $RP_1$ (RP=$RP_1$), it is evaluated that there is a possibility of collision, i.e., a situation where the vehicle collides with an obstacle in a case where deceleration is not performed, and the current state is maintained. In a case where the value of the risk potential RP is $RP_2$ (RP=$RP_2$), it is evaluated that there is a high degree of possibility of collision, i.e., a situation where the vehicle may collide in a time shorter than the case where the value of the risk potential RP is $RP_1$. In a case where the value of the risk potential RP is $RP_3$ (RP=$RP_3$), it is evaluated that there is an extremely high degree of possibility of collision, i.e., a situation where the vehicle may collide in a time shorter than the case where the value of the risk potential RP is $RP_2$.

FIG. 17(b) is a table illustrating an activation situation of each system with respect to the risk potential RP. As illustrated in FIG. 17(b), an audio output apparatus constituting the HVI 55 outputs a warning sound in accordance with the risk potential RP. In a case where the value of the risk potential RP is $RP_0$(RP=$RP_0$), the audio output apparatus does not output any sound. In a case where the value of the risk potential RP is $RP_1$ or $RP_2$ (RP=$RP_1$, RP=$RP_2$), the audio output apparatus intermittently outputs a sound "pi pi pi . . . ". In a case where the risk potential RP is $RP_3$ (RP=$RP_3$), the audio output apparatus continuously outputs a sound "beep . . . ".

As illustrated in FIG. 17(b), a display apparatus constituting the HVI 55 displays a warning image on a display screen in accordance with the risk potential RP. In a case where the risk potential RP is $RP_0$ (RP=$RP_0$), the display apparatus does not display a warning image on the display screen. In a case where the risk potential RP is $RP_1$, $RP_2$, or $RP_3$ (RP=$RP_1$, RP=$RP_2$, RP=$RP_3$), the display apparatus displays, on the display screen, a warning image including a characters "watch out front" and a figure schematically illustrating a rear portion of a vehicle.

As illustrated in FIG. 17(b), the acceleration pedal counterforce motor 51, the brake pedal counterforce motor 52, and the steer-counterforce motor 53 generate vibrations with the acceleration pedal 10, the brake pedal 11, and the steering 16 in accordance with the risk potential RP. In a case where the risk potential RP is $RP_0(RP=RP_0)$, the counterforce motors 51, 52, 53 do not generate any vibration. The counterforce motors 51, 52, 53 generate "weak", "medium", "strong" vibrations when the value of the risk potential RP is $RP_1$, $RP_2$, $RP_3$, respectively.

FIG. 17(c) is an explanatory diagram for explaining a braking force automatically applied to the vehicle in accordance with a relative distance from an elk (elk) E and a braking force applied to the vehicle performing avoiding operation with the driver's steering operation. An activation state of each system and a braking force applied to the vehicle 0 when the vehicle 0 approaches the elk E, i.e., an obstacle, will be explained with reference to FIG. 17(b) and FIG. 17(c).

In a case where the relative distance between the vehicle 0 and the elk E is sufficiently long, and the value of the risk potential RP is $RP_0$, the automatic brake is not activated (see FIG. 15). Therefore, when the driver does not perform any steering operation, any braking force is not generated in the vehicle 0. In a case where the value of the risk potential RP is $RP_0$, the value of the distribution ratio $R_{FR}$ of the friction braking force is 0.0, and the value of the distribution ratio $R_R$ of the regenerative braking force is 1.0. At this occasion, when the driver performs the steering operation, a regenerative braking force associated with the lateral motion is generated in the rear wheels (two wheels), so that the vehicle 0 decelerates. In a case where the value of the risk potential RP is $RP_0$, the audio output apparatus does not output any warning sound, and a warning image is not displayed on the display screen of the display apparatus, so that vibration is note generated with the acceleration pedal 10, the brake pedal 11, and the steering 16.

In a case where the value of the risk potential RP is $RP_1$, the automatic brake is not activated (see FIG. 15), and unless the driver's steering operation is not performed, any braking force is not generated in the vehicle 0. The audio output apparatus outputs a warning sound "pi pi pi . . . ", and generates "weak" vibration with the acceleration pedal 10, the brake pedal 11, and the steering 16, so that the driver is notified that there is a possibility of collision. In a case where the value of the risk potential RP is $RP_1$, the value of the distribution ratio $R_{FR}$ of the friction braking force is 0.4, and the value of the distribution ratio $R_R$ of the regenerative braking force is 0.6. More specifically, as compared with the case where the value of the risk potential RP is $RP_0$, the distribution ratio $R_{FR}$ of the friction braking force is determined to be a high value, and the state of the vehicle 0 is in a state having an improved avoiding potential. At this occasion, when the driver performs steering operation, a regenerative braking force associated with the lateral motion is generated in the rear wheels (two wheels), and a friction braking force associated with the lateral motion is generated in the four wheels, so that the vehicle 0 decelerates.

In a case where the value of the risk potential RP is $RP_2$, an automatic brake (precrash brake) serving as the warning brake is activated (see FIG. 15). The audio output apparatus outputs a warning sound "pi pi pi . . . ", and a vibration "medium" is generated with the acceleration pedal 10, the brake pedal 11, and the steering 16, and a warning image is displayed on the display screen of the display apparatus, and the driver is notified that there is a high degree of possibility of collision. In a case where the value of the risk potential RP is $RP_2$, the value of the distribution ratio $R_{FR}$ of the friction braking force is 0.6, and the value of the distribution ratio $R_R$ of the regenerative braking force is 0.4. Therefore, the braking force with the warning brake is distributed between the regenerative braking force and the friction braking force to be applied to the vehicle 0. As compared with the case where the value of the risk potential RP is $RP_1$, the distribution ratio $R_{FR}$ of the friction braking force is determined to be a high value in this state, and the state of the vehicle 0 is a state having a still further improved avoiding potential. When the driver performs steering operation, a regenerative braking force associated with the lateral motion is generated in the rear wheels (two wheels), and a friction braking force associated with the lateral motion is generated in the four wheels, so that the vehicle 0 decelerates.

In a case where the value of the risk potential RP is $RP_3$, an automatic brake (precrash brake) serving as an emergency brake is activated (see FIG. 15). The audio output apparatus outputs a warning sound "beep . . . ", and a "strong" vibration is generated in the acceleration pedal 10, the brake pedal 11, and the steering 16, the warning image is displayed on the display screen of the display apparatus, so that the driver is notified that there is an extremely high degree of possibility of collision. In a case where the value of the risk potential RP is $RP_3$, the value of the distribution ratio $R_{FR}$ of the friction braking force is 1.0, and the value of the distribution ratio $R_R$ of the regenerative braking force is 0.0. Therefore, the braking force with the emergency brake is applied to the four wheels as the friction braking force. Further, when the driver performs the steering operation, a friction braking force associated with the lateral motion is generated in the four wheels, and the vehicle 0 decelerates. In a case where the value of the risk potential RP is $RP_3$, the value of the distribution ratio $R_R$ of the regenerative braking force is 0.0, and the value of the distribution ratio $R_{FR}$ of the friction braking force is 1.0, and therefore, the problems such as (i) to (iv) explained above are less likely to occur, and the maximum deceleration can be obtained with the four wheels, and the emergency evasion can be performed in an advantageous manner.

Figure 18A:
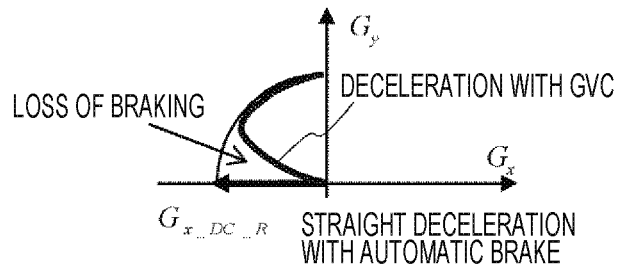
FIGS. 18A-18C are explanatory diagrams for explaining an association between a deceleration with automatic brake and a deceleration associated with lateral motion generated by GVC.
Figure 18B:
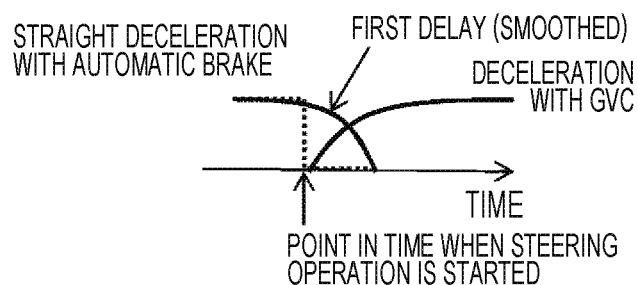
Figure 18C:
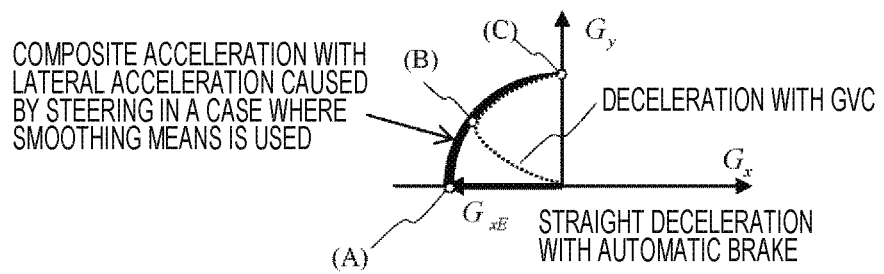

FIGS. 18(a) to 18(c) are explanatory diagrams for explaining an association between a deceleration achieved with the automatic brake and a deceleration associated with lateral motion achieved with the GVC. FIG. 18(a) illustrates a g-g diagram illustrating how a composite acceleration G ($G_x$, $G_y$) of a longitudinal acceleration and a lateral acceleration changes in a coordinate system constituted by an x axis representing the longitudinal acceleration and a y axis representing the lateral acceleration.

As illustrated in FIG. 18, when only the automatic brake is activated, and the brake associated with the lateral motion is not activated, the deceleration applied to the vehicle is only $G_{x\_DC\_R}$, and therefore, there is only a transition of deceleration on the $G_x$ axis.

On the other hand, a curved line indicated by a thick solid line in the figure indicates a transition of the composite acceleration G ($G_x$, $G_y$) of the lateral acceleration and the deceleration associated with the lateral motion with the GVC during avoiding operation when the steering 16 is steered. The start point of this composite acceleration G ($G_x$, $G_y$) is the origin point, and during avoiding operation to the left, a positive lateral acceleration and a deceleration in the longitudinal direction associated with the positive lateral acceleration are applied to the vehicle, and therefore, when the lateral acceleration increases, and the vehicle moves to another lane at the left side, the composite acceleration G ($G_x$, $G_y$) moves in the second quadrant.

JP 2009-262701 A (hereinafter referred to as PTL 2) describes a technique for determining a time in which a braking control is prohibited when the steering angle of the driver or the steering angle speed increases in the automatic brake control. According to this technique, when the driver performs avoiding operation while the automatic brake is activated, the automatic brake is deactivated.

In the present embodiment, the lateral acceleration is generated according to the avoiding operation, and therefore, the deceleration control associated with the lateral motion is performed. Therefore, the same technique as PTL 2 is performed in the present embodiment, an instantaneous drop of deceleration, i.e., so-called "loss of brake (loss of G)", may occur from a point in time at which the automatic brake is deactivated to a point in time at which the deceleration associated with the lateral motion is activated. The occurrence of the "loss of brake (loss of G)" may degrade the driving feeling, and in addition, this may cause a rapid change of the driver's viewpoint due to pitching or cause a change in the vertical load of the tires, and there is a concern that the avoiding performance based on steering operation might decrease.

Therefore, in the present embodiment, smoothing means (not shown) such as, e.g., a first-order delay filter (low pass filter) is provided in the ADAS controller 40 so as to prevent the deceleration from decreasing rapidly (in a step form) immediately after the steering operation is started when the steering operation is performed while the automatic brake is activated. When the smoothing means is provided, as illustrated in FIG. 18(b), the smoothing means smoothly connect the deceleration not associated with the lateral motion that is reduced when the automatic brake is deactivated and the deceleration associated with the lateral motion that is started when the steering operation is started and that increases when the lateral jerk increases, and as illustrated in FIG. 18(c), after the deceleration is performed in a straight line manner with the automatic brake, the composite acceleration G moves in an arc form from a point A to a point B, and further, the composite acceleration G can smoothly move to the point C where only the lateral motion is applied. Therefore, the viewpoint of the driver can be stabilized, and the change of the vertical load can be alleviated, so that it is easy for the driver to calmly perform the avoiding operation even in an emergency state.

According to the first embodiment explained above, the following actions and effects can be obtained.

(1) The distribution ratio determining unit 42 is provided to determine the distribution ratio $R_{FR}$ for determining the magnitude of the friction braking force and the distribution ratio $R_R$ for determining the magnitude of the regenerative braking force, and the distribution ratio determining unit 42 determines the distribution ratio $R_{FR}$ on the basis of the risk potential RP determined by the risk-potential determining unit 41. The distribution ratio $R_{FR}$ can be determined on the basis of the risk potential, for example, at a stage before steering operation such as, e.g., emergency evasion, is performed or before automatic brake is activated. Therefore, in a case where the risk potential RP determined by the risk-potential determining unit 41 becomes higher, the distribution ratio $R_{FR}$ is determined so that the magnitude of the friction braking force becomes larger, so that in accordance with driver's operation during emergency evasion or at an initial stage immediately after braking force is automatically generated in the vehicle, large deceleration can be generated by using the friction braking force for the vehicle, and cornering force for lateral movement can be generated. More specifically, according to the present invention, the emergency evasion performance can be generated.

(2) In a case where the value of the risk potential RP is less than $RP_1$, the distribution ratio $R_{FR}$ of the friction braking force (≤0.4) is configured to be a value less than the distribution ratio $R_R$ of the regenerative braking force (≥0.6), and in a case where the value of the risk potential RP is equal to or more than $RP_2$, the distribution ratio $R_{FR}$ of the friction braking force (≥0.6) is configured to be a value more than the distribution ratio $R_R$ of the regenerative braking force (≤0.4).

Therefore, in a state in which the chance of collision is low, the cost efficiency of electricity can be improved by adding a braking force mainly constituted by regenerative braking force to the vehicle, and the frequency of use of the friction braking device 65 can be suppressed. When the frequency of use of the friction braking device 65 is suppressed, the life of the friction braking device 65 can be improved. A low-cost deceleration actuator having a low level of NVH (Noise, Vibration, Harshness) performance is used for the friction braking device 65, so that the cost of the vehicle can be reduced. On the other hand, the chance of collision is high, the emergency evasion performance can be improved by adding a braking force mainly constituted by friction braking force to the vehicle.

(3) In a case where the risk potential RP becomes higher, the distribution ratio $R_{FR}$ is determined so that the magnitude of the friction braking force becomes larger, and accordingly, in the case where the risk potential RP becomes higher, the distribution ratio $R_R$ is determined so that the magnitude of the regenerative braking force becomes smaller. More specifically, a summation of the friction braking force and the regenerative braking force matches the requested braking force of the vehicle 0, so that the braking force suitable for the driver's operation can be activated.

(4) In a case where the risk potential RP becomes higher, the number of wheels to which the braking force is applied is increased, so that the load ratio for the tire can be alleviated, and the reduction of the cornering force of the front wheels can be suppressed. As a result, the emergency evasion performance is improved.

(5) The frictional braking target deceleration $G_{xF}$ is derived from the distribution ratio $R_{FR}$ and the target longitudinal acceleration $G_x$ in view of the precrash brake deceleration $G_{x\_DC\_R}$, and the regenerative braking target deceleration $G_{xR}$ is derived from the distribution ratio $R_R$ and the target longitudinal acceleration $G_x$ in view of the precrash brake deceleration $G_{x\_DC\_R}$. Therefore, at a stage when precrash brake (warning brake and emergency brake) is generated, the friction braking force can be achieved effectively, and therefore, the emergency evasion performance can be improved.

(6) The precrash brake deceleration $G_{x\_DC\_R}$ is configured to be higher as the risk potential RP becomes higher. More specifically, as the situation requiring the emergency evasion operation becomes higher, the deceleration $G_{x\_DC\_R}$ becomes higher, and therefore, the friction braking force can be achieved effectively in accordance with the situation.

(7) The frictional braking target deceleration $G_{xF}$ is derived from the distribution ratio $R_{FR}$ and the target longitudinal acceleration $G_x$ in view of the longitudinal acceleration ($C_{xy} \cdot G_y\_\text{dot}$) associated with the lateral motion, and the regenerative braking target deceleration $G_{xR}$ is derived from the distribution ratio $R_R$ and the target longitudinal acceleration $G_x$ in view of the longitudinal acceleration ($C_{xy} \cdot G_y\_\text{dot}$) associated with the lateral motion. Therefore, the braking force generated by the GVC when the lateral motion according to steering operation for emergency evasion is performed is distributed among the friction braking force and the regenerative braking force in accordance with the risk potential, so that the emergency evasion performance can be improved.

Second Embodiment

Figure 19:
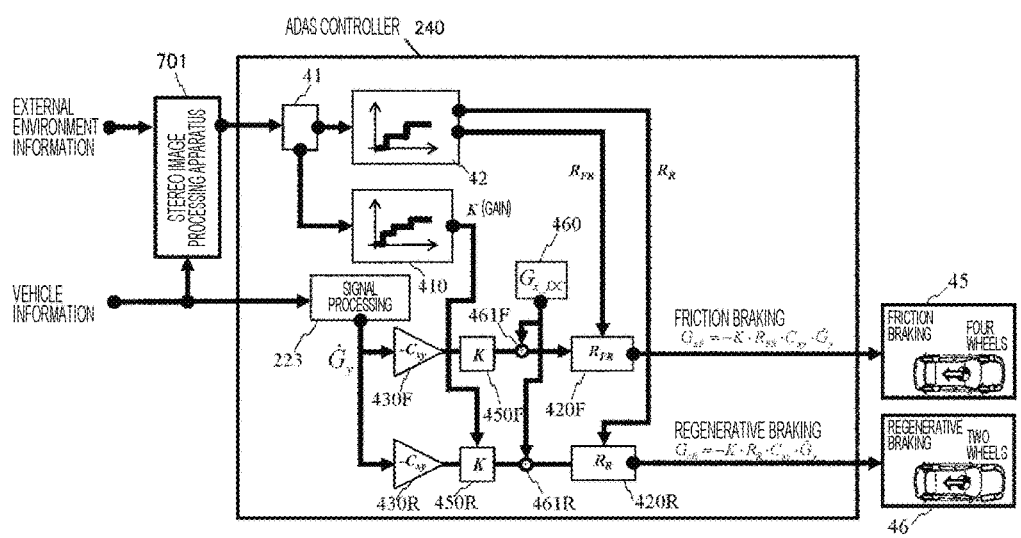
FIG. 19 is a functional block diagram illustrating an ADAS controller, a friction brake controller, and a power train controller constituting an operation control system for a vehicle according to a second embodiment.

An operation control system for a vehicle according to the second embodiment will be explained with reference to FIG. 19. FIG. 19 is a functional block diagram illustrating an ADAS controller 240, a friction brake controller 45, and a power train controller 46 constituting the operation control system for the vehicle according to the second embodiment. In FIG. 19, signals and the like received by a $G_{x\_DC}$ determining unit 460 are not shown in order to avoid complications. In the figure, the same or corresponding portions as those of the first embodiment are denoted with the same reference numerals, and only differences will be mainly explained. The vehicle according to the second embodiment has the same configuration as the vehicle of the first embodiment (see FIG. 10).

In the first embodiment, an example where the gain $C_{xy}$ by which the lateral jerk $G_y\_dot$ is multiplied is adopted as the constant value has been explained. In contrast, in the second embodiment, on the basis of the risk potential RP, the gain by which the lateral jerk $G_y\_dot$ is multiplied is adjusted, and the magnitude of the deceleration control associated with the lateral motion is changed.

As illustrated in FIG. 19, the ADAS controller 240 according to the second embodiment is functionally provided with a risk-potential determining unit 41, a distribution ratio determining unit 42, a signal processing unit 223, a gain determining unit 410, first gain multiplication units 430F, 430R, second gain multiplication units 450F, 450R, a $G_{x\_DC}$ determining unit 460 for determining the precrash brake deceleration $G_{x\_DC\_R}$ a and the longitudinal acceleration $G_{x\_DC\_D}$ on the basis of the driver's operation of the acceleration pedal 10 and the driver's operation of the brake pedal 11, ratio multiplication units 420F, 420R, and adder devices 461F, 461R.

Like the first embodiment, the risk-potential determining unit 41 determines the risk potential RP on the basis of the external environment information and the vehicle information. Like the first embodiment, the distribution ratio determining unit 42 determines a distribution ratio $R_{FR}$ of the friction braking force and a distribution ratio $R_R$ of the regenerative braking force on the basis of the risk potential RP.

The signal processing unit 223 determines the lateral jerk $G_y\_dot$ by differentiating the lateral acceleration received as the vehicle information, and outputs the lateral jerk $G_y\_dot$ to the first gain multiplication units 430F, 430R. More specifically, the signal processing unit 223 is configured so that the function of the differential circuit 23 according to the first embodiment is executed by the ADAS controller 240, and in the second embodiment, the differential circuit 23 of the first embodiment is omitted.

The first gain multiplication unit 430F derives a deceleration $(-C_{xy} \cdot G_y\_dot)$ by multiplying the received lateral jerk $G_y\_dot$ by the lateral motion associated gain $(-C_{xy})$, and outputs the deceleration $(-C_{xy} \cdot G_y\_dot)$ to the second gain multiplication unit 450F. The second gain multiplication unit 450F a deceleration $(-K \cdot C_{xy} \cdot G_y\_dot)$ by multiplying the received deceleration $(-C_{xy} \cdot G_y\_dot)$ by a normalization gain (K), and outputs the deceleration $(-K \cdot C_{xy} \cdot G_y\_dot)$ to the adder device 461F.

The adder device 461F derives a target longitudinal acceleration $G_x$ by adding the deceleration G; not associated with the lateral motion to the received deceleration $(-K \cdot C_{xy} \cdot G_y\_dot)$, and outputs the target longitudinal acceleration $G_x$ to the ratio multiplication unit 420F. The ratio multiplication unit 420F derives the frictional braking target deceleration $G_{xF}$ by multiplying the received target longitudinal acceleration $G_x$ by the distribution ratio $R_{FR}$ of the friction braking force, and outputs a deceleration control command representing the frictional braking target deceleration $G_{xF}$ to the friction brake controller 45.

Like the first embodiment, the friction brake controller 45 controls the caliper 65c constituting the friction braking device 65 on the basis of the frictional braking target deceleration $G_{xF}$, and generates the friction braking force.

The first gain multiplication unit 430R derives a deceleration $(-C_{xy} \cdot G_y\_dot)$ by multiplying the received lateral jerk $G_y\_dot$ with the lateral motion associated gain $(-C_{xy})$, and outputs the deceleration $(-C_{xy} \cdot G_y\_dot)$ to the second gain multiplication unit 450R. The second gain multiplication unit 450R derives a deceleration $(-K \cdot C_{xy} \cdot G_y\_dot)$ by multiplying the received deceleration $(-C_{xy} \cdot G_y\_dot)$ with the normalization gain (K), and outputs the deceleration $(-K \cdot C_{xy} \cdot G_y\_dot)$ to the adder device 461R.

The adder device 461R derives the target longitudinal acceleration $G_x$ by adding the deceleration $G_x$ Dr not associated with the lateral motion to the received deceleration $(-K \cdot C_{xy} \cdot G_y\_dot)$, and outputs the target longitudinal acceleration $G_x$ to the ratio multiplication unit 420R. The ratio multiplication unit 420R derives the regenerative braking target deceleration $G_{xR}$ by multiplying the received target longitudinal acceleration $G_x$ by the distribution ratio $R_R$ of the regenerative braking force, and outputs a deceleration control command representing the regenerative braking target deceleration $G_{xR}$ to the power train controller 46.

Like the first embodiment, the power train controller 46 generates the regenerative braking force on the basis of the regenerative braking target deceleration $G_{xF}$.

Figure 20A:
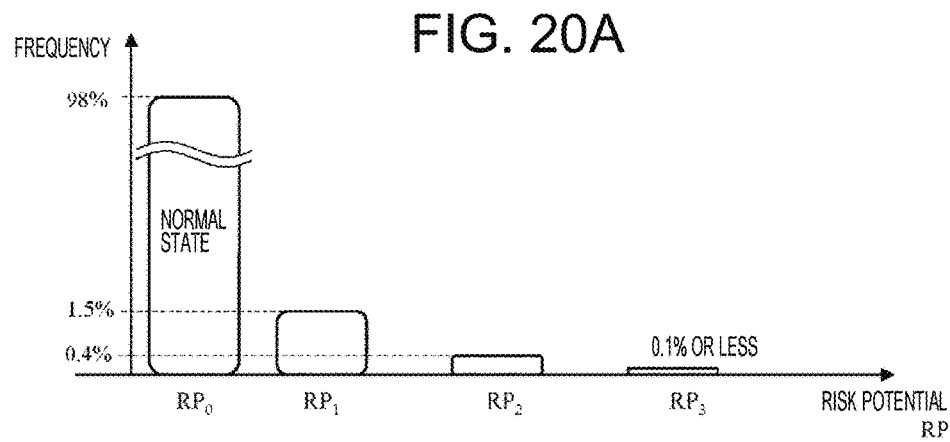
FIG. 20A is a figure illustrating statistics of the frequency of occurrence of each risk potential with respect to the total activation time (lifetime activation time)

A determination method of the normalization gain K will be explained with reference to FIGS. 20(a) to 20(c). FIG. 20(a) is a figure illustrating statistics of the frequency of occurrence of each risk potential ($RP_0$, $RP_1$, $RP_2$, $RP_3$) with respect to the total activation time (lifetime activation time). As illustrated in FIG. 20(a), the state of $RP_0$ is extremely high, i.e., about 98%, as compared with the other states. The frequency of $RP_1$ is low, i.e., about 1.5%. The frequency of $RP_2$ is still lower, i.e., about 0.4%. The frequency of $RP_3$ is the lowest, i.e., 0.1% or less.

Figure 20B:
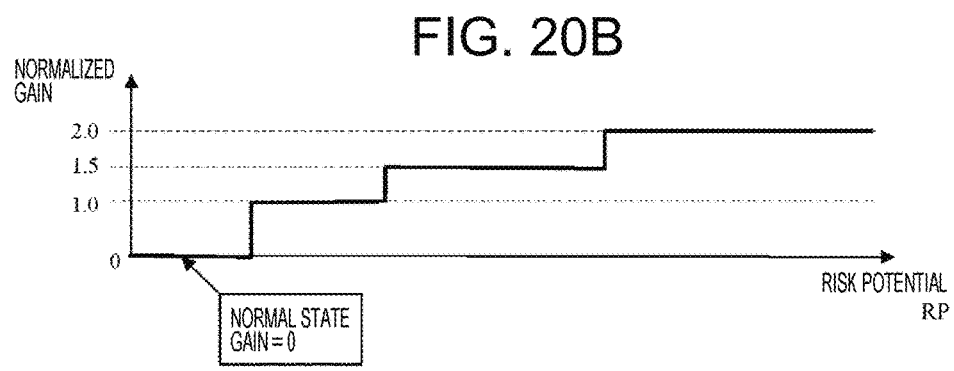
FIG. 20B is a figure illustrating a relationship between a risk potential and a normalization gain.
Figure 20C:
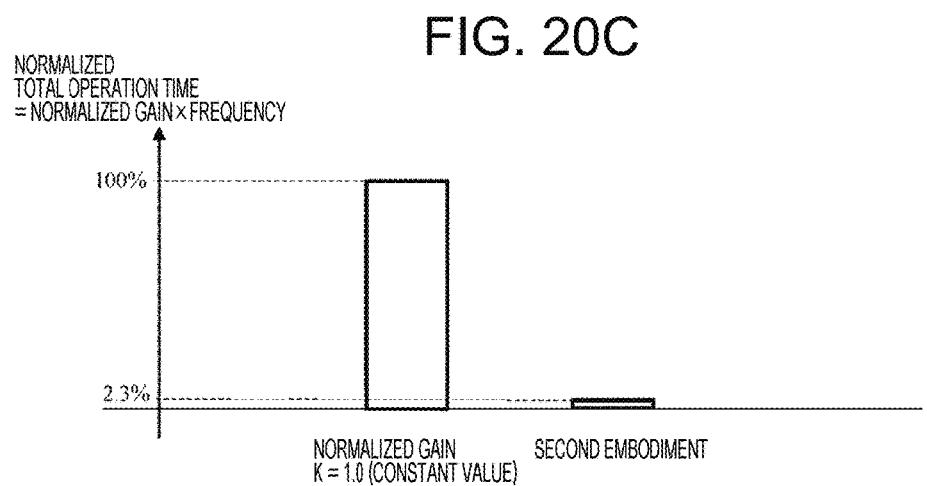
FIG. 20C is a figure for comparing a normalization total activation time between a case where the normalization gain K is set to 1.0 and the second embodiment.

FIG. 20(b) is a figure illustrating a relationship between the risk potential RP and the normalization gain K. The storage device of the ADAS controller 240 previously stores, in a look up table format, characteristics of the normalization gain K with respect to the risk potential RP as illustrated in FIG. 20(b). As illustrated by a solid line in the figure, the increment characteristics of the normalization gain K with respect to the risk potential RP is determines so as to increase in a stepwise manner in accordance with the increase in the risk potential RP.

The gain determining unit 410 refers to the table of the normalization gain K (see FIG. 20(b)), and reads the normalization gain K corresponding to the risk potential RP determined by the risk-potential determining unit 41.

In a case where the value of the risk potential RP is $RP_0$, the gain determining unit 410 determines that the value of the normalization gain K is 0.0, and in a case where the value of the risk potential RP is $RP_1$, the gain determining unit 410 determines that the value of the normalization gain K is 1.0 (K=1.0). In a case where the value of the risk potential RP is $RP_2$, the gain determining unit 410 determines that the value of the normalization gain K is 1.5 (K=1.5), and in a case where the value of the risk potential RP is $RP_3$, the gain determining unit 410 determines that the value of the normalization gain K is 2.0 (K=2.0).

In a case where the value of the risk potential RP is $RP_0$, the gain ($K \cdot C_{xy}$) becomes zero, and even when lateral motion occurs, the value of the target longitudinal acceleration becomes zero. As illustrated in FIG. 20(*a*), a normal state in which the value of the risk potential RP is $RP_0$ is attained in almost all the total activation time (lifetime activation time), and therefore, when the value of the gain (K·Cxy) in the normal state is set to zero, so that the frequency of use of the friction braking device 65 can be greatly suppressed.

FIG. 20(*c*) is a figure for comparing a normalization total activation time between a case where the value of the normalization gain K is set to 1.0 and the second embodiment. As illustrated in FIG. 20(*c*), when the activation time is defined as 100% in a case where the normalization gain K is 1.0 (constant value) (like the first embodiment) regardless of the magnitude of the value of the risk potential RP, the normalized total activation time (also in view of the activation strength) in the second embodiment can be reduced to 2.3%.

When a so-called ESC for performing deceleration by using a pumped up hydraulic pressure is used for a deceleration actuator constituting the friction braking device 65, there may be a problem in the durability of the pump unit in many cases as compared with regeneration based on another motor or Continuously Variable Transmission (CVT) and the like. Furthermore, noises generated during activation may be problematic in many cases. In order to cope with such problem, it may be possible to cope with activation from a normal region by employing a so-called "premium specification" configuration using a multi-cylinder plunger pumps and gear pumps, but this causes a problem in that the cost is greatly increased. More specifically, even though it is required to attach the ESC even in a low price range vehicle, there is a problem in that these vehicles cannot employ the "premium specification" configuration because of the limitation in the cost.

In the present embodiment, as described above, the value of the gain (K·Cxy) in the normal state is set to zero, so that the deceleration caused by automatic brake in the normal state and the deceleration associated with the lateral motion are not performed. As a result, in the total activation time (lifetime activation time), the frequency of the use of the friction braking device 65 can be suppressed, and therefore, the activation time greatly affecting the durability of the pump unit of the deceleration actuator can be greatly reduced, and therefore, the lifetime of the friction braking device 65 can be improved. More specifically, even though the "premium specification" configuration explained above is not employed, the emergency evasion performance can be improved.

According to the second embodiment explained above, not only the actions and effect of the first embodiment but also the following actions and effects can be achieved.

(8) In the second embodiment, as the risk potential RP becomes lower, the gain by which the longitudinal acceleration is multiplied is reduced. Therefore, even though the "premium specification" configuration is not employed, the lifetime of the friction braking device 65 can be improved. When the value of the risk potential RP is high, a certain level of activation sounds, vibrations, and jerky motion feeling are tolerated, and therefore, when a low cost deceleration actuator having a low level of NVH performance is used for the friction braking device 65, so that the cost of the vehicle can be reduced. More specifically, even with a low price range vehicle, the configuration of the present embodiment is employed, and the emergency evasion performance can be improved.

(9) In a normal, state in which the value of the risk potential RP is low, both of the deceleration caused by the friction braking force and the deceleration caused by the regenerative braking force can be reduced, and therefore, the driving feeling can be improved without jerky motion during steering operation. On the other hand, during an emergency evasion steering in a state in which the value of the risk potential RP is high, the driver can be assisted by generating the deceleration.

(10) As the risk potential RP becomes higher, the gain by which the target longitudinal acceleration is multiplied is increased, so that the avoiding performance can be greatly improved when the change of collision is high.

The following modifications are also within the scope of the present invention, and one of more of the modifications can also be combined with the above embodiments.

(Modification 1)

In the above embodiments, an example in which the risk potential RP is determined by using a reciprocal number ($1/t_c$) of time-to-collision has been explained, but the present invention is not limited thereto. The risk potential RP is determined on the basis of at least one of the external environment information and the vehicle information, and various methods may be employed. Hereinafter, a determination method different from the above embodiments will be explained.

(Modification 1-1)

Figure 21:
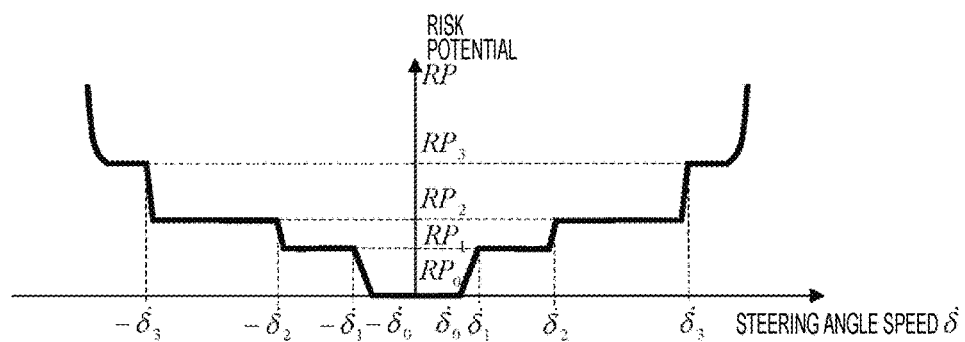
FIG. 21 is a figure illustrating a relationship between a steering angle speed and a risk potential.

An example for determining a risk potential on the basis of a steering angle speed will be explained. In this case, a steering angle sensor 33 (see FIG. 10) detecting the steering angle of the steering 16 functions as a vehicle information obtaining unit for obtaining vehicle information used to determine the risk potential. FIG. 21 is a figure illustrating a relationship between the steering angle speed and the risk potential RP. In general, the steering angle speed is faster during steering operation for performing emergency evasion than in the normal state. Therefore, in a case where the risk potential RP is determined by using the steering angle speed, the risk potential RP may be defined to be higher as the steering angle speed becomes faster.

In FIG. 21, the horizontal axis represents the steering angle speed, and the vertical axis represents the risk potential. In a case where the steering angle speed is positive, this indicates that a steering operation is performed to the right side, and in a case where the steering angle speed is negative, this indicates that a steering operation is performed to the left side. In FIG. 21, the characteristics of the risk potential with respect to the steering angle speed are of the same characteristics between the steering operation to the left side and the steering operation to the right side, and more specifically, FIG. 21 is right-left symmetrical, but FIG. 21 may be asymmetric in accordance with a lane in which the vehicle passes through.

(Modification 1-2)

An example for determining a risk potential on the basis of a steering angle and a steering angle speed will be explained as an example for determining a risk potential on the basis of multiple pieces of vehicle information. In this case, a steering angle sensor 33 (see FIG. 10) detecting the steering angle and the steering angle speed of the steering 16 functions as a vehicle information obtaining unit obtaining vehicle information used for determining the risk potential.

Figure 22:
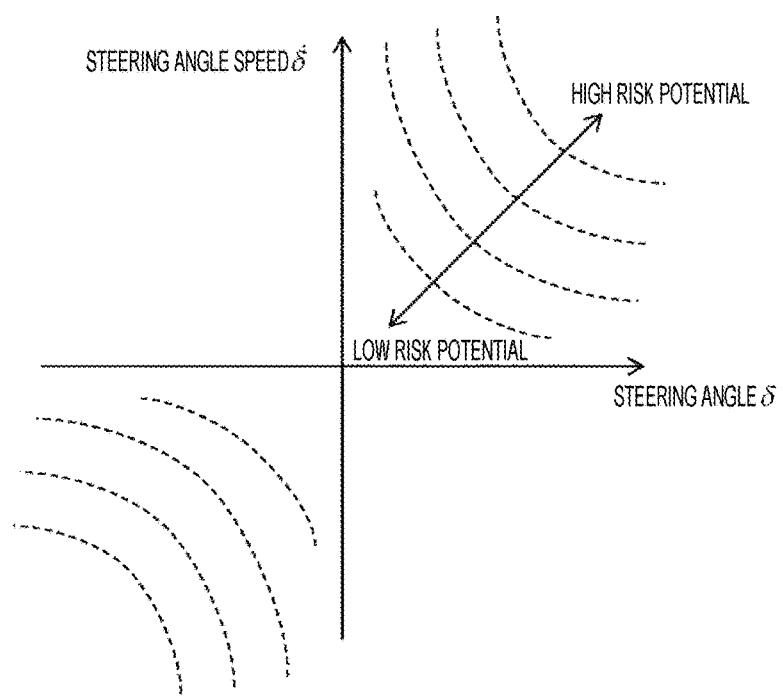
FIG. 22 is a figure illustrating a relationship of a steering angle, a steering angle speed, and a risk potential.

FIG. 22 is a figure illustrating a relationship of the steering angle, the steering angle speed, and the risk potential RP. In FIG. 22, the horizontal axis represents the steering angle, and the vertical axis represents the steering angle speed, and the broken line represents the characteristics of the risk potential RP. The risk potential RP may be determined from a two-dimensional map of the steering angle and the steering angle speed as illustrated in FIG. 22 in view of counter steer which is steering operation for quickly returning the steering wheel in the opposite direction while the steering wheel is turned in any one of the right and the left directions. As described above, there may be multiple parameters for determining the risk potential RP.

(Modification 1-3)

An example for determining the risk potential will be explained on the basis of a deviation between an estimated value of the lateral motion of the vehicle 0 and an actually-measured time. In this case, a longitudinal acceleration detected by the longitudinal acceleration sensor 22, a lateral acceleration detected by the lateral acceleration sensor 21, a steering angle of the steering 16 detected by the steering angle sensor 33, a yawrate detected by the yawrate sensor 38, a vehicle speed calculated from a wheel speed detected by a wheel speed sensor including a wheel speed detection rotor and a wheel speed pickup, a vehicle lateral slip angle calculated from the information, and the like are obtained as vehicle information.

Figure 23A:
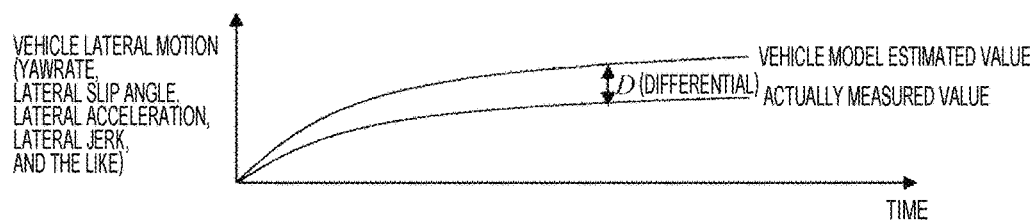
FIG. 23A is a time chart illustrating a deviation between a vehicle model estimated value and an actually-measured value.
Figure 23B:
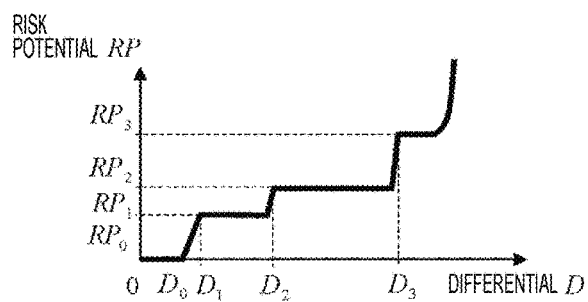
FIG. 23B is a figure illustrating a relationship between a deviation and a risk potential.

FIG. 23(a) is a time chart illustrating a deviation between a vehicle model estimated value and an actually-measured value. FIG. 23(b) is a figure illustrating a relationship between the deviation and the risk potential RP. For example, a model disclosed in JP 2010-076584 A is known as a vehicle lateral motion model. A value calculated using this vehicle lateral motion model (vehicle model estimated value) is adjusted to match the actually-measured value while the cornering force generated in the wheels is in a linear relationship with the vehicle lateral slip angle.

On the other hand, during emergency evasion and the like, the steering angle increases, and the lateral acceleration increases, and therefore, the linearity between the tire lateral slip angle and the cornering force is lost. In such situation, there is a great difference between a model estimation standard operation and an actual operation. As a result, while this difference, i.e., the deviation D as illustrated in FIG. 23(a), is considered to be small, the degree of emergency is low, and as the difference becomes greater, the degree of emergency is considered to be increasing. Therefore, in a case where the risk potential RP is determined by using the deviation D between the standard operation and the actual operation, the risk potential RP may be determined to be higher as the deviation D increases as illustrated in FIG. 23(b).

(Modification 1-4)

Figure 24:
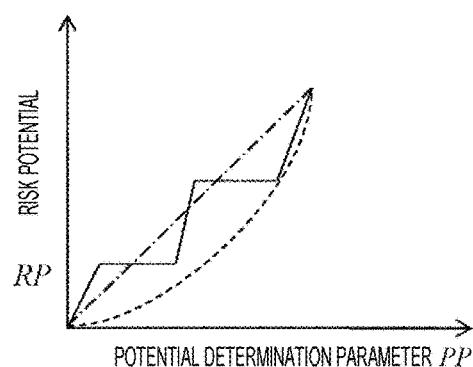
FIG. 24 is a figure illustrating a relationship between a potential determination parameter and a risk potential.

Alternatively, potential determination parameters for determining the risk potential RP can be defined from various kinds of vehicle information. For example, a pedal angle speed in a direction for releasing an acceleration pedal 10, i.e., vehicle information, and a pedal angle speed in a direction for depressing a brake pedal 11, i.e., vehicle information, are defined as a potential determination parameter PP, and as illustrated in FIG. 24, the risk potential RP may be defined to be higher as the potential determination parameter PP (pedal angle speed) becomes larger. In this case, the acceleration pedal sensor 31 for detecting the operation speed of the acceleration pedal 10 and the brake pedal sensor 32 for detecting the operation speed of the brake pedal 11 function as a vehicle information obtaining unit for obtaining vehicle information used to determine the risk potential.

It should be noted that the characteristics of the risk potential RP with respect to the potential determination parameter PP may employ various kinds of change characteristics such as characteristics of increasing in a stepwise manner as the potential determination parameter PP becomes larger (solid line in the figure), characteristics of increasing in a straight line manner (alternate long and short dashed lines in the figure), and characteristics of increasing in a curved line manner (broken line in the figure). Hereinafter, parameters for determining the risk potential RP (reciprocal number of time-to-collision, steering angle, steering angle speed, pedal angle speed, and the like) are collectively referred to as the potential determination parameter PP.

Figure 25:
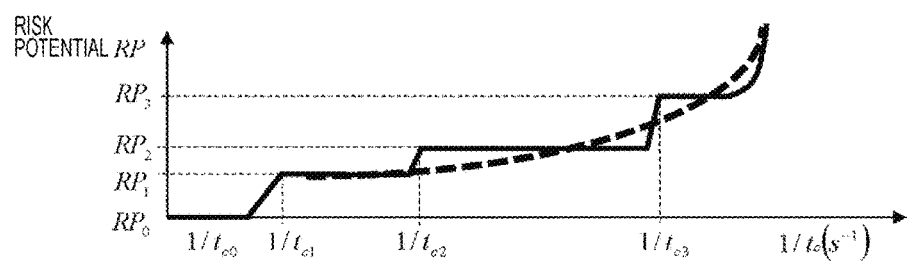
FIG. 25 is a figure illustrating a relationship between a reciprocal number of time-to-collision and a risk potential.

When the characteristics of the risk potential RP are determined, a dangerous situation in which avoiding steering operation and avoiding braking operation are required may be assumed, and the characteristics can be set as necessary in accordance with experiments, simulation, and the like. In the dangerous situation, the characteristics are preferably set also in view of the fact that operation information and motion information about the vehicle greatly changes or rapidly changes in many cases. The characteristics of the risk potential RP with respect to the reciprocal number of the time-to-collision as illustrated in FIG. 13 are not limited to the case of the stepwise manner, and as indicated by a broken line of FIG. 25, the characteristics of the risk potential RP can be characteristics of continuously changing in a curved line manner.

(Modification 1-5)

Alternatively, the risk potential RP can be determined from various kinds of external environment information. For example, environment information about the front of the vehicle may be obtained, and a road surface state (frictional coefficient and the like) may be estimated, and a road surface inclination and the like may be estimated, and the risk potential may be quantified with respect to the cruising environment of the front of the vehicle. What should be noted here is as follows. In a case of a downward slope where the road surface inclination is great, the risk potential may be high, and in a direction for improving a lateral motion associated gain, but in a case where a road surface frictional coefficient is low, the risk potential may be high, but the wheels may be locked if the lateral motion associated gain is improved, and therefore, it is necessary to increase the gain, and execute well-known wheels excessive slip preventing control.

(Modification 1-6)

A GPS (Global Positioning System) navigation sensor 39 may collate position information obtained by GPS satellites with dynamic map data distributed by communication, and can obtain external environment information such as information about a course shape such as a curvature of a corner at the front of the driver's vehicle, information about a traffic light, road sign information, inclination information, and the like. When the ADAS controller 40 determines that, for example, the speed is too fast for the corner at the front (a situation in which the vehicle enters into a course as illustrated in FIG. 5 at a speed of 80 km/h) from the external environment information and vehicle information about the vehicle speed of the driver's vehicle and the like, the ADAS controller 40 needs to increase the value of the risk potential RP.

(Modification 1-7)

A risk potential may be determined by using a time-to-collision tc expressed by an expression (6).

[Math 7]

$$t_c = -\frac{x_r}{v_r} \quad (6)$$

The time-to-collision is an index for predicting a time it takes for the driver's vehicle to collide with a preceding vehicle while the current relative speed vr is considered to be maintained.

(Modification 1-8)

A risk potential may be determined by using a close or apart state evaluation index KdB expressed by an expression (7).

[Math 8]

$$KdB = 10 \times \log\left(\frac{v_r}{x_r^3} \times \frac{-2.0}{5.0 \times 10^{-8}}\right) \quad (7)$$

The close or apart state evaluation index KdB is an index defined on the basis of a hypothesis that "the driver performs acceleration and deceleration operation by detecting the distance to the preceding vehicle from a visual change in the size of area of the preceding vehicle."

(Modification 1-9)

A risk potential may be determined by using a time-head way THW expressed by an expression (8).

[Math 9]

$$t_h = -\frac{x_r}{v_f} \quad (8)$$

The time-head way THW is an index representing a time it takes to reach a current preceding vehicle position at the current speed of the driver's vehicle.

(Modification 1-10)

A risk potential may be determined by using a risk feeling (RF) expressed by an expression (9).

[Math 10]

$$RF = \frac{a}{t_c} + \frac{b}{t_h} \quad (9)$$

Variables a, b are weighting constants obtained in advance.

The risk feeling RF is an index for defining, as a risk felt by the drier, a linear sum of reciprocal numbers of a time-to-collision TTC and a time-head way THW for the purpose of expressing, in a physical quantity, vehicle speed control characteristics of the driver when the driver follows a preceding vehicle.

(Modification 1-11)

In the above embodiments, an example using a stereo camera 70 and a stereo image processing apparatus 701 for obtaining external environment information used for determining the risk potential has been explained, but an external environment information obtaining unit described below may be employed as another example. The external environment information obtaining unit for obtaining external environment information may employ a vehicle front information detection unit detecting information about an object existing at the front of the vehicle 0 such as a laser radar and a millimeter-wave radar, an inter-vehicle communication unit receiving information about another vehicle existing around the vehicle 0, and a road-vehicle communication unit receiving environment information at the front of the vehicle 0. For example, a risk potential may be determined by obtaining, as external environment information, information indicating a lane at the front of the vehicle 0 is frozen on the road surface, information indicating that the width of the lane at the front of the vehicle 0 is narrower, and road information indicating, e.g., there exists a steep curve at the front of the vehicle 0.

(Modification 1-12)

Multiple risk potentials of the risk potentials explained in the above embodiments and those explained in (modification 1-1) to (1-11) may be obtained, and the highest risk potential may be selected therefrom, and the distribution ratio of each of the friction braking force and the regenerative braking force may be determined on the basis of the selected risk potential.

(Modification 2)

Figure 26:
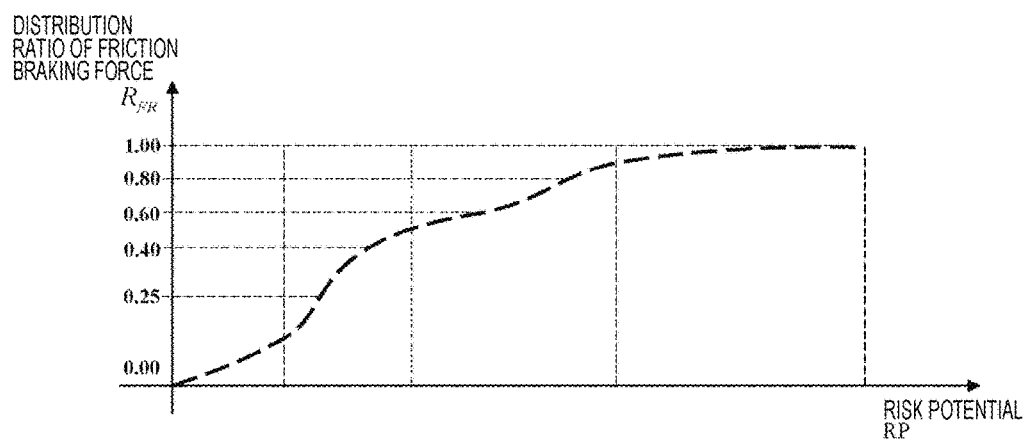
FIG. 26 is a figure illustrating a relationship between a risk potential and a distribution ratio of friction braking force.

In the above embodiments, an example where the distribution ratio $R_{FR}$ of the friction braking force increases in a stepwise and continuous manner as the risk potential RP becomes higher has been explained (see FIG. 14), but as illustrated in FIG. 26, as the risk potential RP becomes higher, the distribution ratio $R_{FR}$ of the friction braking force may be configured to be higher continuously. In this case, the risk potential RP has such characteristics that it is not a discontinuous value, and changes continuously as the potential determination parameter PP becomes higher.

Figure 27A:
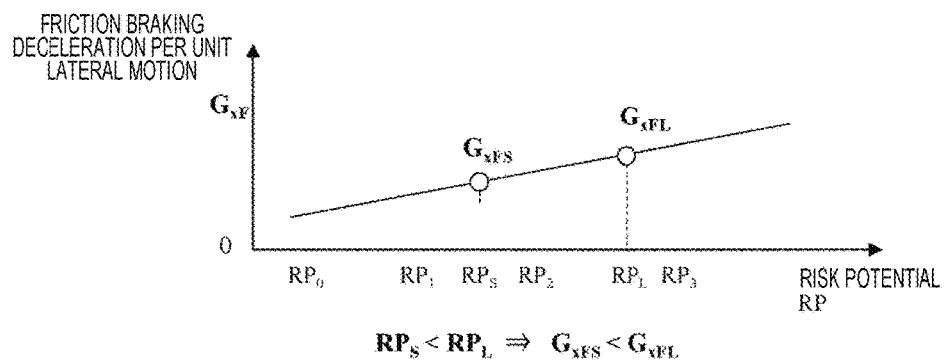
FIG. 27A is a graph in which the vertical axis represents a frictional braking target deceleration per unit lateral motion, and the horizontal axis represents a risk potential.
Figure 27B:
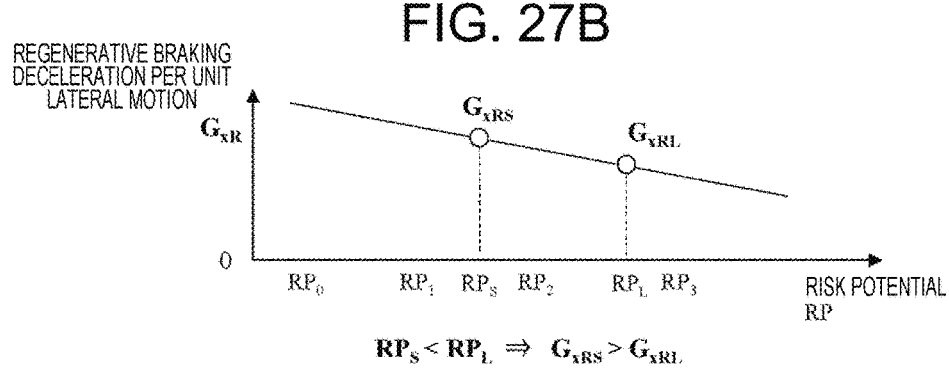
FIG. 27B is a graph in which the vertical axis represents a regenerative braking target deceleration per unit lateral motion, and the horizontal axis represents the risk potential.

In a case where the distribution ratio $R_{FR}$ changes continuously in association with the risk potential RP that changes continuously, a tendency as illustrated in FIG. 27(a) and FIG. 27(b) can be obtained. FIG. 27(a) is a graph in which the vertical axis represents a friction braking target deceleration $G_{xF}$ per unit lateral motion (for example, lateral jerk 1 m/s$^3$), and the horizontal axis represents the risk potential RP. FIG. 27(b) is a graph in which the vertical axis represents a regenerative braking target deceleration $G_{xR}$ per unit lateral motion (for example lateral jerk 1 m/s$^3$), and the horizontal axis represents the risk potential RP.

In a case where a magnitude relationship between $PR_S$ and $PP_L$ as illustrated in the graph satisfies $RP_S<RP_L$, the magnitude relationship of them both satisfies $G_{xFL}>G_{xFS}$ where the friction braking target deceleration for $RP_L$ is denoted as $G_{xFL}$, and the friction braking target deceleration for $RP_S$ is denoted as $G_{xFS}$. Where the regenerative braking target deceleration for $RP_L$ is denoted as $G_{xRL}$, and the regenerative braking target deceleration for $RP_S$ is denoted as $G_{xRS}$, the magnitude relationship of them both satisfies $G_{xRL}<G_{xRS}$.

(Modification 3)

Figure 28:
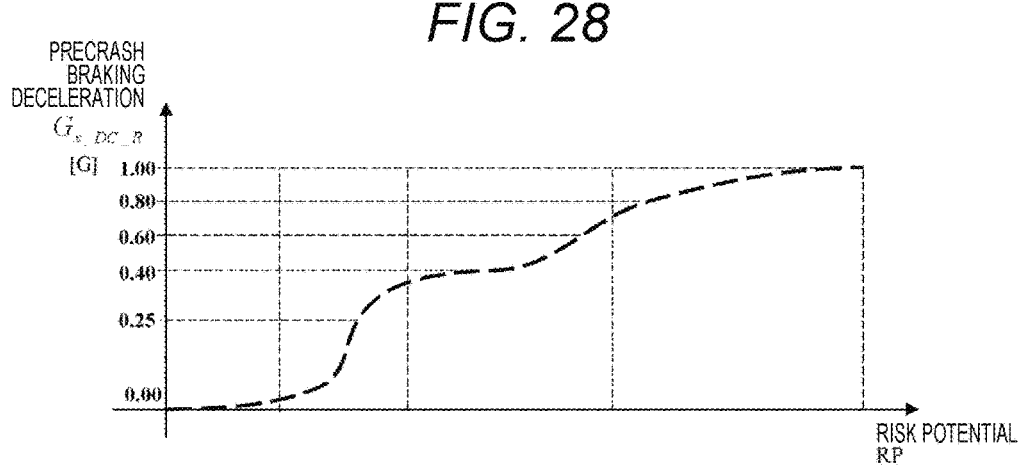
FIG. 28 is a figure illustrating a relationship between a risk potential and precrash brake deceleration.

In the above embodiments, an example in which the precrash brake deceleration $G_{x\_DC\_R}$ increases in a stepwise and discontinuous manner as the risk potential RP becomes higher has been explained (see FIG. 15), but as illustrated in FIG. 28, as the risk potential RP becomes higher, the deceleration $G_{x\_DC\_R}$ may be configured to become higher continuously. In this case, the risk potential RP is not a discontinuous value, and has characteristics of changing continuously as the potential determination parameter PP becomes higher.

(Modification 4)

In the second embodiment, an example in which the normalization gain K increases in a stepwise and discontinuous manner as the risk potential RP becomes higher has been explained (see FIG. 20(b)), but as illustrated in FIG. 29, as the risk potential RP becomes higher, the normalization gain K may be configured to become higher continuously. In this case, the risk potential RP is not a discontinuous value, and has characteristics of changing continuously as the potential determination parameter PP becomes higher.

In a case where the normalization gain K changes continuously in accordance with the risk potential RP changing continuously, the tendency as illustrated in FIG. 30 is obtained. FIG. 30 is a graph in which the vertical axis represents a target longitudinal acceleration (deceleration) $G_x$ of the vehicle per unit lateral motion (for example lateral jerk 1 m/s$^3$), and the horizontal axis represents the risk potential RP.

In a case where a magnitude relationship between $PR_S$ and $PP_L$ as illustrated in the graph satisfies $RP_S<RP_L$, the magnitude relationship of them both satisfies $G_{pL}>G_{pS}$ where the target longitudinal acceleration for $RP_L$ is denoted as $G_{pT}$, and the target longitudinal acceleration for $RP_S$ is denoted as $G_{pS}$.

(Modification 5)

In the above embodiments, an example has been explained in which the distribution ratio $R_{FR}$ of the friction braking force is determined as the first control value for determining the magnitude of the friction braking force, and the distribution ratio $R_R$ of the regenerative braking force is determined as the second control value for determining the magnitude of the regenerative braking force, but the present invention is not limited thereto. For example, a first control value α for determining the magnitude of the friction braking force and a second control value β for determining the magnitude of the regenerative braking force may be determined on the basis of the risk potential RP, and a summation of the first control value a and the second control value β may be configured to be equal to or more than one.

In this case, for example, in a case where the risk potential RP becomes higher, the second control value β may kept as a constant value, and only the first control value α may be increased. More specifically, while the regenerative braking force is maintained, only the magnitude of the friction braking force (absolute quantity) may be increased.

(Modification 6)

In the above embodiments, an example has been explained in which the target longitudinal acceleration of the vehicle is determined by adding the longitudinal acceleration associated with the lateral motion and the longitudinal acceleration associated with the lateral motion, but the present invention is not limited thereto. One of the longitudinal acceleration associated with the lateral motion and the longitudinal acceleration associated with the lateral motion whichever the absolute value is smaller may be selected and determined as the target longitudinal acceleration of the vehicle.

(Modification 7)

In the second embodiment, an example has been explained in which the deceleration $(-K \cdot C_{xy} \cdot G_y\_dot)$ is derived by multiplying the lateral motion associated gain $(-C_{xy})$ which is a constant value and the normalization gain (K) which changes in accordance with the risk potential RP, but the present invention is not limited thereto. Instead of the multiplication by the normalization gain K, the lateral motion associated gain $(-C_{xy})$ may be configured to be a variable, and the lateral motion associated gain $(-C_{xy})$ may be changed in accordance with the risk potential RP.

(Modification 8-1)

In the above embodiments, an example has been explained in which the lateral acceleration detected by the lateral acceleration sensor 21 is differentiated to calculate the lateral jerk, and the longitudinal acceleration associated with the lateral motion is calculated on the basis of the lateral jerk and the gain $C_{xy}$, but the present invention is not limited thereto. The lateral jerk may be calculated from the steering operation of the steering 16, and the longitudinal acceleration associated with the lateral motion may be calculated on the basis of this lateral jerk and the gain $C_{xy}$. Further, the longitudinal acceleration associated with the lateral motion may be calculated on the basis of the gain $C_{xy}$ and one of the lateral jerk derived from the lateral acceleration and the lateral jerk derived from the steering operation whichever is larger or an average value of them both.

(Modification 8-2)

In the above embodiments, an example has been explained in which the vehicle 0 is decelerated in accordance when the increase in the absolute value of the lateral acceleration of the vehicle 0, and the longitudinal acceleration is determined so as to accelerate the vehicle in accordance with the decrease in the absolute value of the lateral acceleration of the vehicle 0, but the present invention is not limited thereto. The vehicle 0 may be decelerated in accordance with the increase in the absolute value of the steering angle detected by the steering angle sensor 33, and the longitudinal acceleration may be determined so as to accelerate the vehicle as the absolute value of the steering angle decreases.

(Modification 9)

In the above embodiments, for example, an example has been explained in which in a case where the value of the risk potential RP changes from $RP_0$ to $RP_3$, the wheels to which the braking force is applied change from the two wheels to the four wheels, and more specifically, an example has been explained in which in a case where the risk potential RP increases, the number of wheels to which the braking force is applied increases, but the present invention is not limited thereto. For example, when the value of the risk potential RP is $RP_0$, the distribution ratio of the friction braking force is set to 0.2, and regardless of the magnitude of the risk potential RP, the wheels to which the braking force is applied may be the four wheels at all times. In a case where the regenerative braking force of the motor is configured to be applied to each of the four wheels, the wheels to which the braking force is applied is the four wheels at all times even when the distribution ratio of the friction braking force is 0.0, but even in this configuration, the distribution ratio of the friction braking force is increased as the risk potential RP becomes higher, so that the emergency evasion performance can be improved. It should be noted that most of the vehicles has the regenerative braking applied to either the front wheels or the rear wheels, and for such vehicles, the number of braking wheels is increased in a case where the risk potential becomes higher, so that the load ratio of the tires can be reduced, and the effect of the change in the regenerative braking force due to the SOC can be suppressed, this can improve the performance for tracking the deceleration in reality with respect to the command value.

(Modification 10)

In the above embodiments, a vehicle having four wheels has been explained as an example, but the present invention is not limited thereto. The present invention can be applied to a vehicle having six or more wheels.

(Modification 11)

Along with the control explained in the above embodiments, when the value of the risk potential RP becomes equal to or more than a predetermined value, prebrake operation may be automatically performed to fill a dead band of a hydraulic brake for friction braking.

(Modification 12)

In the above embodiments, an example in which the risk potential RP is set in four levels has been explained, but the present invention is not limited thereto. The risk potential RP may be set in five or more levels or may be set in three or less levels. It should be noted that the risk potential RP may be set in two levels, i.e., risk potentials "present" and "absent". In this specification, the risk potential "present" has the same meaning as a meaning that the risk potential is higher than the risk potential "absent".

(Modification 13)

During emergency evasion, there is a driver who tries to perform avoiding by performing a highly skilled driving operation. Therefore, there may be a possibility that an interference occurs between an operation caused by the driver's operation and "the longitudinal acceleration control associated with the lateral motion". For example, in a case of a rear wheels driving vehicle, the driver may perform an acceleration as well as steering operation with full throttle to reduce the rear wheels lateral force with the driving force, and perform avoiding operation by rapidly starting yawing operation, or the driver may perform avoiding operation by locking the rear wheels by operating the parking brake to be in a so-called spin turn state. In order to cope with such situation, a threshold value may be set in advance for an acceleration operation quantity and a parking brake operation quantity, and when an operation quantity exceeding the threshold value is detected, the normalization gain K may be set to a value smaller than a value determined according to the risk potential, and more specifically, the normalization gain K may be set to, for example, zero. Therefore, in a case where the acceleration operation quantity from the driver is input to exceed the predefined threshold value, the longitudinal acceleration associated with the lateral motion becomes zero, so that the interference with the operation caused by the driver's operation can be prevented.

(Modification 14)

In the above embodiments, an example has been explained in which in a case where the GVC for activating the braking force in synchronization with the lateral motion of the vehicle is performed, or in a case where the precrash brake is activated, the braking force of the vehicle generated at that occasion is distributed among the friction braking force and the regenerative braking force in accordance with the distribution ratio determined on the basis of the risk potential, but the present invention is not limited thereto. In a stage before the driver operates the brake pedal 11, the distribution ratio of each of the friction braking force and the regenerative braking force may be determined on the basis of the risk potential, and the braking force of the vehicle generated by the driver's operation with the brake pedal 11 may be distributed among the friction braking force and the regenerative braking force in accordance with the distribution ratio determined on the basis of the risk potential.

(Modification 15)

In the above embodiments, an example has been explained in which the characteristics of the risk potential RP, the distribution ratio $R_{FR}$, the deceleration $G_{x\_DC\_R}$, and the normalization gain K are stored to the storage device of the ADAS controller 40 in advance in a look up table format, but the present invention is not limited thereto. For example, instead of the data in the look up table format, a function representing the characteristics may be stored in advance in a storage device.

(Modification 16)

The above embodiments have been explained with an example in which the control program executed by the ADAS controllers 40, 240 is stored in the storage devices of the ADAS controllers 40, 240, but the present invention is not limited thereto. A control program and an installation program may be provided in a storage medium such as a CD-ROM 904. Further, these programs may be provided via a transmission medium such as a communication circuit represented by the Internet and the like. More specifically, the programs can also be transmitted in such a manner that the programs are converted into a signal on a carrier wave for carrying the transmission medium.

FIG. 31 is a figure illustrating how this is achieved. The onboard controller 900 is the ADAS controllers 40, 240, and has a connection function for connecting with a communication circuit 901. The computer 902 is a server computer for providing the above programs, and stores programs in a storage medium such as a hard disk 903. The communication circuit 901 is communication circuits such as the Internet, personal computer communication, or dedicated communication circuits. The computer 902 reads the programs by using the hard disk 903, and transmits the programs via the communication circuit 901 to the onboard controller 900. More specifically, the programs are transmitted as a data signal via a carrier wave via the communication circuit 901. As described above, the programs can be provided as various kinds of computer-readable computer program products such as a storage medium and a data signal (carrier wave).

As long as the features of the present invention are not lost, the present invention is not limited to the above embodiments, and the other modes that can be conceived of within the scope of the technical concept of the present invention are also included in the scope of the present invention.

REFERENCE SIGNS LIST 1 motor
2 electric control transmission
7 power steering
10 acceleration pedal
11 brake pedal
16 steering
21 lateral acceleration sensor
22 longitudinal acceleration sensor
23 differential circuit
24 differential circuit
30 steering controller
31 acceleration pedal sensor
32 brake pedal sensor
33 steering angle sensor
38 yawrate sensor
39 navigation sensor
40 ADAS controller
40A longitudinal acceleration determining unit
41 risk-potential determining unit
42 distribution ratio determining unit
43 friction braking deceleration determining unit
44 regenerative braking deceleration determining unit
45 friction brake controller
46 power train controller
48 pedal controller 51 acceleration pedal counterforce motor
52 brake pedal counterforce motor
53 steer-counterforce motor
61 left front wheel
62 right front wheel
63 left rear wheel
64 right rear wheel
65 friction braking device
65c caliper
65r brake roller
70 stereo camera
101 preceding vehicle
223 signal processing unit
240 ADAS controller
410 gain determining unit
420F ratio multiplication unit
420R ratio multiplication unit
430F first gain multiplication unit
430R first gain multiplication unit
450F second gain multiplication unit
450R second gain multiplication unit
460 $G_{x\_DC}$ determining unit
461F adder device
461R adder device
701 stereo image processing apparatus
900 onboard controller
901 communication circuit
902 computer
903 hard disk

The invention claimed is:

1. An operation control system for a vehicle, comprising:
a risk-potential determining unit determining a risk potential of a vehicle on the basis of at least one of external environment information and vehicle information;
a friction braking device giving a friction braking force to the vehicle; and
a regenerative braking device giving a regenerative braking force to the vehicle,
wherein the operation control system comprises a control value determining unit determining a first control value for determining a magnitude of the friction braking force and a second control value for determining a magnitude of the regenerative braking force, and
the control value determining unit determines at least the first control value on the basis of a risk potential determined by the risk-potential determining unit.

2. The operation control system for the vehicle according to claim 1, wherein in a case where the risk potential determined by the risk-potential determining unit becomes higher, the control value determining unit determines the first control value so that the magnitude of the friction braking force becomes larger.

3. The operation control system for the vehicle according to claim 2, wherein the control value determining unit is a ratio determining unit determining a distribution ratio of the friction braking force as the first control value and determining a distribution ratio of the regenerative braking force as the second control value in order to distribute a braking force applied to the vehicle to the friction braking force and the regenerative braking force,
in a case where the risk potential determined by the risk-potential determining unit is less than a predetermined value, the ratio determining unit lets the distribution ratio of the friction braking force be a value less than the distribution ratio of the regenerative braking force, and
in a case where the risk potential determined by the risk-potential determining unit is higher than a predetermined value, the ratio determining unit lets the distribution ratio of the friction braking force be a value larger than the distribution ratio of the regenerative braking force.

4. The operation control system for the vehicle according to claim 2, wherein in a case where the risk potential determined by the risk-potential determining unit becomes higher, the control value determining unit determines the second control value so that a magnitude of the regenerative braking force becomes smaller.

5. The operation control system for the vehicle according to claim 1, to comprising a braking wheel control unit increasing a number of wheels, to which the braking force is applied, in a case where the risk potential determined by the risk-potential determining unit becomes higher.

6. The operation control system for the vehicle according to claim 1, to comprising:
a deceleration determining unit determining a deceleration of the vehicle on the basis of the risk potential determined by the risk-potential determining unit; and
a braking force determining unit determining the magnitude of the friction braking force on the basis of the deceleration and the first control value, and determining the magnitude of the regenerative braking force on the basis of the deceleration and the second control value.

7. The operation control system for the vehicle according to claim 6, wherein the deceleration determined by the deceleration determining unit becomes higher as the risk potential becomes higher.

8. The operation control system for the vehicle according to claim 1, comprising:
a deceleration determining unit determining the deceleration of the vehicle on the basis of one of or both of a steering operation for the vehicle and a lateral motion of the vehicle; and
a braking force determining unit determining the magnitude of the friction braking force on the basis of the deceleration and the first control value, and determining the magnitude of the regenerative braking force on the basis of the deceleration and the second control value.

9. The operation control system for the vehicle according to claim 1, to wherein an external environment information obtaining unit obtaining the external environment information is constituted by at least one of a vehicle front information detection unit detecting information about an object existing in front of the vehicle, an inter-vehicle communication unit receiving information about another vehicle existing around the vehicle, and a road-vehicle communication unit receiving environment information in front of the vehicle, and
a vehicle information obtaining unit obtaining the vehicle information is constituted by at least one of a vehicle speed detection unit detecting a vehicle speed of the vehicle, a steering angle detection unit detecting a steering angle of the vehicle, an acceleration detection unit detecting an acceleration of the vehicle, a yawrate detection unit detecting a yawrate of the vehicle, an acceleration operation speed detection unit detecting an operation speed of an acceleration pedal of the vehicle, and a brake operation speed detection unit detecting an operation speed of a brake pedal of the vehicle.

10. The operation control system for the vehicle according to claim 1, wherein the risk-potential determining unit determines the risk potential on the basis of at least one of a time-to-collision between the vehicle and an obstacle, a steering angle of the vehicle, a deviation between an estimated value of a lateral motion of the vehicle and an actually-measured value.

11. The operation control system for the vehicle according to claim 1, to comprising:
a first storage unit previously storing characteristics of the first control value that becomes larger as the risk potential becomes higher,
wherein the control value determining unit determines the first control value corresponding to the risk potential on the basis of a characteristic of the first control value stored in the first storage unit.

12. The operation control system for the vehicle according to claim 8, comprising:
a gain storage unit previously storing a characteristic of a gain that becomes larger as the risk potential becomes higher,
wherein the deceleration determining unit includes:
a first deceleration determining unit determining a first deceleration of the vehicle on the basis of the risk potential;
a gain determining unit determining the gain corresponding to the risk potential on the basis of the characteristic of the gain stored in the gain storage unit; and
a second deceleration determining unit determining a second deceleration by multiplying the first deceleration determined by the first deceleration determining unit by the gain determined by the gain determining unit, and
the braking force determining unit determines the magnitude of the friction braking force on the basis of the second deceleration and the first control value, and determines the magnitude of the regenerative braking force on the basis of the second deceleration and the second control value.

13. The operation control system for the vehicle according to claim 8, comprising:
a lateral acceleration detection unit detecting a lateral acceleration of the vehicle,
wherein the deceleration determining unit is a longitudinal acceleration determining unit for determining a longitudinal acceleration for decelerating the vehicle as an absolute value of a lateral acceleration of the vehicle increases, and accelerating the vehicle as the absolute value of the lateral acceleration of the vehicle decreases.

14. The operation control system for the vehicle according to claim 8, comprising:
a steering angle detection unit detecting a steering angle of the vehicle,
wherein the deceleration determining unit is a longitudinal acceleration determining unit for determining a longitudinal acceleration for decelerating the vehicle as an absolute value of a steering angle of the vehicle increases, and accelerating the vehicle as the absolute value of the steering angle of the vehicle decreases.

15. The operation control system for the vehicle according to claim 8, wherein the deceleration determining unit is a longitudinal acceleration determining unit determining a longitudinal acceleration Gx in accordance with the following expression, $$G_x = -\mathrm{sgn}(G_y \cdot \dot{G}_y)\frac{C_{xy}}{1+Ts}|\dot{G}_y| + G_{x\_DC} \quad \text{※} \quad \dot{G}_y = G_{y\_dot}$$

where Gy denotes a lateral acceleration of the vehicle, Gy_dot denotes a lateral jerk of the vehicle, Cxy denotes a gain, T denotes a first-order delay time constant, s denotes a Laplace operator, Gx_DC denotes a longitudinal acceleration associated with the lateral motion of the vehicle.

16. The operation control system for the vehicle according to claim 8, wherein the deceleration determining unit is a longitudinal acceleration determining unit, wherein in a case where, in a vehicle fixed coordinate system in which a forward direction of the vehicle is defined as positive in an x axis and a left direction of the vehicle is denoted as positive in a y axis, a steering input to a left side which is positive in the y direction is input into the vehicle, or the vehicle starts a left turning which is positive in the y direction, a lateral acceleration of the vehicle is generated in a positive direction, and a longitudinal acceleration of the vehicle is generated in a negative direction, so that, in a coordinate system in which a longitudinal acceleration of the vehicle is defined as an x axis, and a lateral acceleration of the vehicle is defined as a y axis, the longitudinal acceleration determining unit determines a longitudinal acceleration in such a manner a transition of a coordinate representing a longitudinal acceleration and a lateral acceleration becomes a smooth curved line in a clockwise direction from around the origin point to a second quadrant.

17. A vehicle comprising the operation control system for the vehicle according to claim 1.

18. A program for causing a computer to execute risk potential determination processing for determining a risk potential of a vehicle having a friction braking device and a regenerative braking device on the basis of at least one of external environment information and vehicle information,
wherein the program causes the computer to execute control value determination processing for determining a first control value for determining a magnitude of a friction braking force which is given by the friction braking device to the vehicle, and determining a second control value for determining a magnitude of a regenerative braking device which is given by the regenerative braking device to the vehicle, and
in the control value determination processing, a first control value for determining at least the magnitude of the friction braking force is determined on the basis of the risk potential determined in the risk potential determination processing.

19. The program according to claim 18, wherein, in the control value determination processing, in a case where the risk potential determined in the risk potential determination processing becomes higher, the first control value is determined so that the magnitude of the friction braking force becomes larger.

20. The program according to claim 19, wherein in the control value determination processing, a distribution ratio of the friction braking force for a braking force of the vehicle is determined as the first control value, and a distribution ratio of the regenerative braking force for the braking force of the vehicle is determined as the second control value,
in a case where the risk potential is less than a predetermined value, the distribution ratio of the friction braking force is defined as a value smaller than the distribution ratio of the regenerative braking force, and
in a case where the risk potential is more than the predetermined value, the distribution ratio of the friction braking force is defined as a value larger than the distribution ratio of the regenerative braking force.

21. The program according to claim 19, wherein in the control value determination processing, in a case where the risk potential becomes higher, the second control value is determined so that the magnitude of the regenerative braking force becomes smaller.

\* \* \* \* \*